United States Patent
Wheatley, III et al.

(10) Patent No.: US 7,515,580 B2
(45) Date of Patent: Apr. 7, 2009

(54) METHOD AND APPARATUS FOR FORWARD POWER CONTROL IN A COMMUNICATION SYSTEM

(75) Inventors: Charles E. Wheatley, III, Del Mar, CA (US); Rashid A. Attar, San Diego, CA (US); Eduardo A. S. Esteves, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 895 days.

(21) Appl. No.: 10/866,296

(22) Filed: Jun. 10, 2004

(65) Prior Publication Data

US 2004/0233867 A1 Nov. 25, 2004

Related U.S. Application Data

(62) Division of application No. 09/755,654, filed on Jan. 5, 2001, now Pat. No. 6,850,499.

(51) Int. Cl.
*H04J 3/24* (2006.01)
(52) U.S. Cl. .................................... 370/349
(58) Field of Classification Search ................. 455/512, 455/513, 522, 456.1; 370/349, 231, 253, 370/465, 468, 235, 395.21, 395.4
See application file for complete search history.

(56) References Cited

U.S. PATENT DOCUMENTS

| | | | |
|---|---|---|---|
| 4,901,307 | A | 2/1990 | Gilhousen et al. |
| 5,056,109 | A | 10/1991 | Gilhousen et al. |

(Continued)

FOREIGN PATENT DOCUMENTS

DE 19911146 10/2000

(Continued)

OTHER PUBLICATIONS

Jalali A. et al., "Data Thoughput of CDMA-HDR a high efficiency-high data rate personal communication wireless system" VTC 2000-Sp 2000. IEEE 51st. Vehicular Technology Conference Proceedings, pp. 1854-1848, May 15-18, vol. 3 XP000968325 Tokyo, Japan.

(Continued)

*Primary Examiner*—Alexander Eisen
*Assistant Examiner*—Eric Elcenko
(74) *Attorney, Agent, or Firm*—Darrell Scott Juneau; Katherine Umpleby

(57) ABSTRACT

In a data communication system capable of variable rate transmission, the data rate is determined by the largest C/I measurement of the forward link signals as measured at the Access Terminal. In one embodiment, the data transmission is scheduled based on an Access Terminal initiated forward power control, which reduces forward link rate quantization loss due to excess transmit power. The Access Terminal reports to the Access Point the excess C/I estimate for the selected rate. The Access Point then reduces its transmit power by an appropriate amount when serving that Access Terminal. In another embodiment, the data transmission is scheduled based on an Access Point initiated forward power control. The Access Point varies its transmit power over time either randomly or in synchronism with neighboring Access Points in the communication system, which enables an increase in the throughput achieved by users that receive a significant amount of interference.

7 Claims, 7 Drawing Sheets

U.S. PATENT DOCUMENTS

| | | | |
|---|---|---|---|
| 5,103,459 | A | 4/1992 | Gilhousen et al. |
| 5,267,261 | A | 11/1993 | Blakeney, II et al. |
| 5,504,773 | A | 4/1996 | Padovani et al. |
| 5,568,483 | A | 10/1996 | Padovani et al. |
| 5,574,982 | A | 11/1996 | Almgren et al. |
| 5,625,876 | A | 4/1997 | Gilhousen et al. |
| 5,751,725 | A | 5/1998 | Chen |
| 5,790,940 | A | 8/1998 | Marquart et al. |
| 5,857,147 | A | 1/1999 | Gardner et al. |
| 5,903,554 | A | 5/1999 | Saints |
| 5,923,650 | A | 7/1999 | Chen et al. |
| 5,933,462 | A | 8/1999 | Viterbi et al. |
| 5,933,787 | A | 8/1999 | Gilhousen et al. |
| 5,995,496 | A | 11/1999 | Honkasalo et al. |
| 6,151,502 | A | 11/2000 | Padovani et al. |
| 6,160,511 | A * | 12/2000 | Pfeil et al. .................. 342/457 |
| 6,175,590 | B1 | 1/2001 | Stein |
| 6,195,337 | B1 | 2/2001 | Nystrom et al. |
| 6,285,655 | B1 | 9/2001 | Lundby et al. |
| 6,335,922 | B1 | 1/2002 | Tiedemann et al. |
| 6,385,462 | B1 | 5/2002 | Baum et al. |
| 6,414,938 | B1 * | 7/2002 | Corke et al. .................. 370/231 |
| 6,449,462 | B1 | 9/2002 | Gunnarsson et al. |
| 6,487,174 | B1 | 11/2002 | Mizuguchi et al. |
| 6,496,543 | B1 | 12/2002 | Zehavi |
| 6,574,211 | B2 | 6/2003 | Padovani et al. |
| 6,597,705 | B1 | 7/2003 | Rezaiifar et al. |
| 6,650,904 | B1 | 11/2003 | Lin et al. |
| 6,879,561 | B1 * | 4/2005 | Zhang et al. ................. 370/235 |

FOREIGN PATENT DOCUMENTS

| | | |
|---|---|---|
| EP | 0709973 | 5/1996 |
| EP | 0897644 | 2/1999 |
| JP | 11055190 | 2/1999 |
| WO | 99/23844 | 5/1999 |
| WO | 9930442 | 6/1999 |
| WO | 0014900 | 3/2000 |
| WO | 0054430 | 9/2000 |
| WO | 0055985 | 9/2000 |

OTHER PUBLICATIONS

International Search Report, PCT/US2001/050641, International Search Authority European Patent Office Feb. 11, 2003.

International Preliminary Examination Report PCT/US2001/050641 IPEA/US Feb. 18, 2004.

European Search Report EP01989272 European Search Authority Munich Aug. 25, 2006.

\* cited by examiner

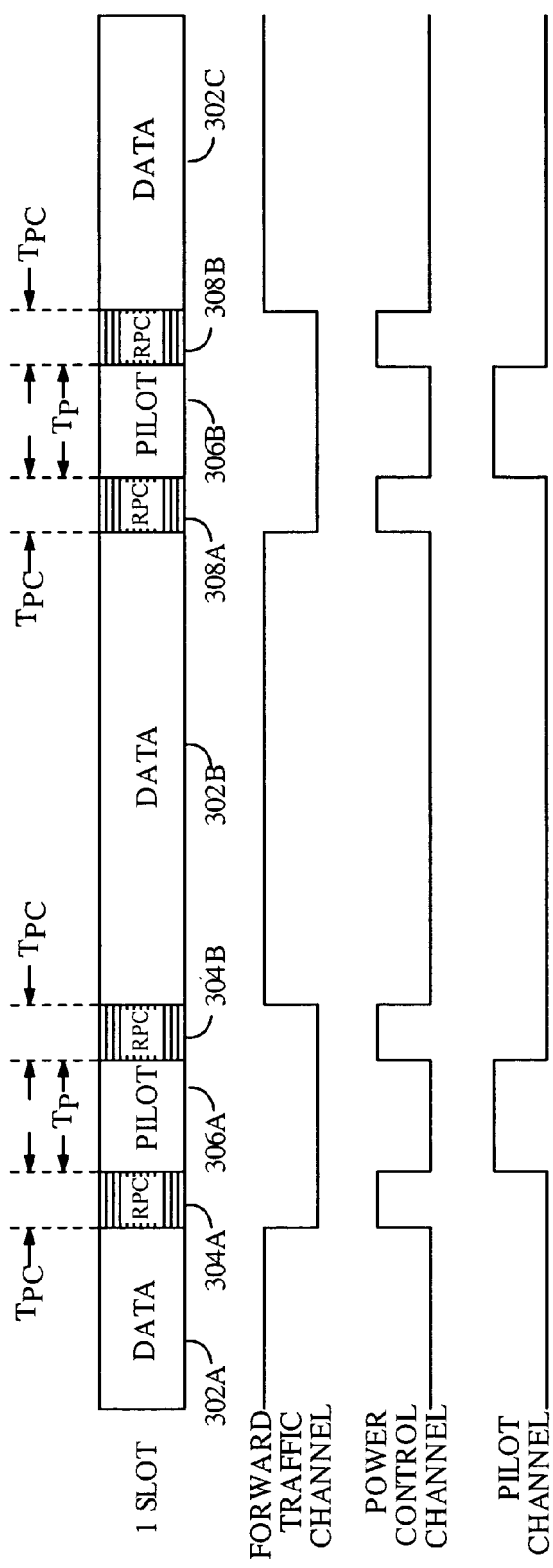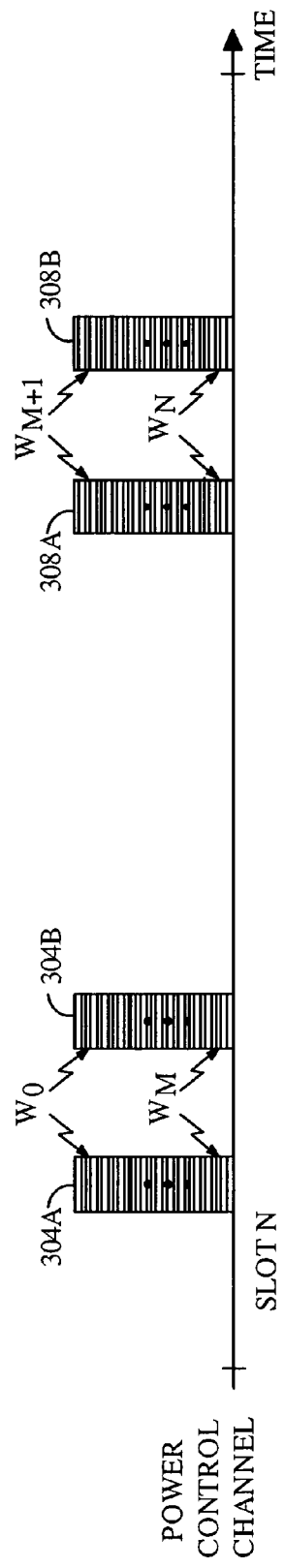
FIG. 4A
FIG. 4B

METHOD AND APPARATUS FOR FORWARD POWER CONTROL IN A COMMUNICATION SYSTEM

CROSS REFERENCE

This application is a divisional application of application Ser. No. 09/755,654, filed Jan. 5, 2001 now U.S. Pat. No. 6,850,499, entitled "Method and Apparatus for Forward Power Control in a Communication System".

BACKGROUND

I. Field

The present invention relates to a communication system. More particularly, the present invention relates to a novel and improved method and apparatus for forward power control in a communication system.

II. Background

A modern day communication system is required to support a variety of applications. One such communication system is a code division multiple access (CDMA) system which conforms to the "TIA/EIA/IS-95 Mobile Station-Base Station Compatibility Standard for Dual-Mode Wideband Spread Spectrum Cellular System," hereinafter referred to as the IS-95 standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated by reference herein.

In a CDMA system, communications between users are conducted through either one or more Access Networks or via a data network for data applications. An Access Network comprises a plurality of Access Points. In one embodiment, the data network is the Internet. In another embodiment, the data network. It would be understood by those skilled in the art that the data network could be any kind of data network known in the art. A first Access Terminal may communicate to a second Access Terminal by transmitting data on a reverse link to an Access Network or a data network.

When the data is transmitted to the Access Network, the Access Network receives the data and can route the data on the forward link to the second Access Terminal or can route the data to another Access Network. The forward link refers to transmission from the Access Network to an Access Terminal and the reverse link refers to transmission from the Access Terminal to an Access Network. In IS-95 systems, the forward link and the reverse link are allocated separate frequencies.

The Access Terminal calculates a signal-to-noise-and-interference ratio C/I for a received forward link signal. The Access Terminal's calculated C/I determines the information rate that can be supported for the forward link from the Access Point to a user's Access Terminal. That is, a given level of performance for the forward link is achieved at a corresponding level of C/I. A method and apparatus for selecting an information rate is disclosed in U.S. patent application Ser. No. 08/963,386 entitled "METHOD AND APPARATUS FOR HIGH RATE PACKET TRANSMISSION," filed Nov. 3, 1997, now U.S. Pat. No. 6,574,211, issued Jun. 3, 2002 to Padovani et al., which is assigned to the assignee of the present invention and fully incorporated herein by reference.

The power at which an Access Point transmits data to an Access Terminal is called the forward link transmit power. The forward link transmit power is at a level required for transmitting data over the forward link reliably. The forward link transmit power is often more than is required for a given reliable data rate. This overage is called "quantization loss." Quantization loss is the quantity of transmit power on the forward link that is beyond that required for a given reliable data rate and therefore is a lost quantity of transmit power, i.e., is wasted. Quantization loss is a problem because it is excess transmit power that limits forward link throughput efficiency and throughput. Excess transmit power of an Access Point causes interference for Access Terminals being served by adjacent Access Points. This interference causes the Access Terminal being served by the Access Point to observe a lower C/I and consequently have a lower data rate. Thus, throughput is limited.

Decreasing the quantization loss would result in a gain in forward link throughput efficiency and throughput. Therefore, a system and method that decreases the loss due to excess transmit power is desired.

The parameters that measure the quality and effectiveness of a data communication system are the transmission delay required for transferring a data packet and the average throughput rate of the system. Transmission delay does not have the same impact in data communication as it does for voice communication, but it is an important metric for measuring the quality of the data communication system. The average throughput rate is a measure of the efficiency of the data transmission capability of the communication system.

When an Access Terminal is in an interference-limited location, i.e., on a cell boundary, the Access Terminal can receive pilot signals from multiple Access Points, which interfere with the pilot signal from the Access Point that is serving the Access Terminal. Consequently, the C/I observed by the Access Terminal is lower on the cell boundary than when the Access Terminal is not on a cell boundary. As a result, the Access Terminal has a lower served rate and a lower data rate than when the Access Terminal is not on a cell boundary. The served rate is the rate at which an Access Point schedules the Access Terminal for service. The data rate is the rate at which the Access Point sends forward link data to the Access Terminal.

From a service point of view, assuming Access Terminals are served by the same Access Point, the Access Terminals that are on a cell boundary are getting served slower (i.e., higher transmission delay) and at a slower data rate (i.e., average throughput rate) than Access Terminals that are not on a cell boundary. A system and method that services more users in a period of time and quickly services those users, is desired.

SUMMARY

The described embodiments are directed to a system and method for forward power control in a communication system. In one aspect, a system and method for forward power control includes an Access Terminal initiated power control. In another aspect, a system and method for forward power control includes an Access Point initiated power control.

In one aspect, a system and method for Access Terminal initiated power control includes paging an Access Terminal of a pending data transmission, selecting an Access Point based on a set of parameters, measuring an excess C/I of forward link signals from the selected Access Point, sending the excess C/I measurement to said selected Access Point, and transmitting data from said selected Access Point at a transmit power in accordance with said excess C/I measurement. In another aspect, a system and method for Access Terminal initiated forward power control includes sending a data request message including the excess C/I measurement to said selected Access Point. In yet another aspect, a system and method for Access Terminal initiated forward power control includes sending a data request message on a first channel to said selected Access Point and sending the excess C/I measurement on a second channel to said selected Access Point.

In one aspect, a system and method for Access Point initiated power control includes receiving data request messages from a plurality of Access Terminals, calculating an average served rate for each of the plurality of Access Terminals, calculating a ratio of requested data rate to the average served rate for each of the plurality of Access Terminals, scheduling a transmission of data from the Access Terminal having the highest ratio of requested data rate to average served rate and transmitting data from said selected Access Point at a randomly varying transmit power in accordance with said data request message. In another aspect, a system and method for Access Point initiated power control includes biasing a schedule of a transmission of data from the Access Terminal based on the ratio of requested data rate to average served rate.

In one aspect, a system and method for Access Point initiated power control includes transmitting data from said selected Access Point at a randomly varying transmit power in accordance with said data request message. In another aspect, a system and method for Access Point initiated power control includes transmitting data from said selected Access Point at a transmit power in synchronism with neighboring Access Points in accordance with said data request message.

BRIEF DESCRIPTION OF THE DRAWINGS

FIG. 4A is the forward link slot structure of an embodiment;

FIG. 4B is the composite waveform of the power control channel;

DETAILED DESCRIPTION OF THE PREFERRED EMBODIMENTS

I. Access Terminals and Access Points

In this specification, Access Point refers to the hardware with which the Access Terminals communicate. An Access Point is also referred to as a Base Station (also called base station transceivers or Node B) in some applications. An Access Terminal is referred to as a Mobile Station (also called mobiles, subscriber units, remote station, or user equipment) in some applications. Cell refers to the hardware or the geographic coverage area, depending on the context in which the term is used. A sector is a partition of a cell. Because a sector of a CDMA system has the attributes of a cell, the teachings described in terms of cells are readily extended to sectors.

The Access Terminal communicates with at least one Access Point during a communication. CDMA Access Terminals are capable of communicating with multiple Access Points simultaneously during soft handoff. Soft handoff is the process of establishing a link with a new Access Point before breaking the link with the previous Access Point. Soft handoff minimizes the probability of dropped calls. The method and system for providing a communication with an Access Terminal through more than one Access Point during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is the process whereby the communication occurs over multiple sectors, which are serviced by the same Access Point. The process of softer handoff is described in detail in U.S. patent application Ser. No. 08/763,498, entitled "METHOD AND APPARATUS FOR PERFORMING HANDOFF BETWEEN SECTORS OF A COMMON BASE STATION," filed Dec. 11, 1996, now U.S. Pat. No. 5,933,787, issued Aug. 3, 1999 to Gilhousen et al., assigned to the assignee of the present invention and incorporated by reference herein It is well known that in cellular systems the signal-to-noise-and-interference ratio C/I of any given user is a function of the location of the user within the coverage area. In order to maintain a given level of service, TDMA and FDMA systems resort to frequency reuse techniques, i.e. not all frequency channels and/or time slots are used in each Access Point. In a CDMA system, the same frequency allocation is reused in every cell of the system, thereby improving the overall efficiency.

Figure 6:
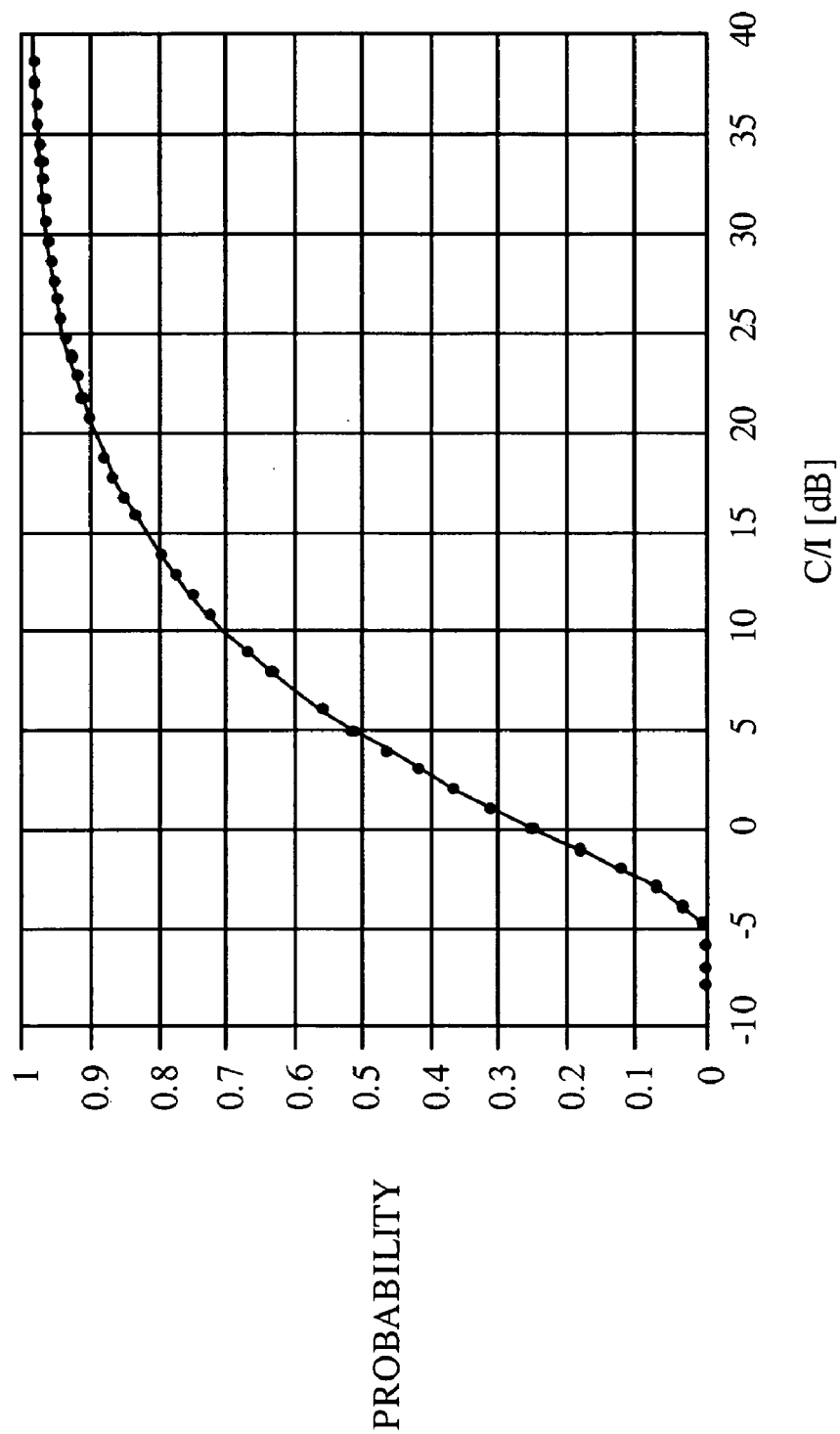
FIG. 6 is a diagram of the cumulative distribution function (CDF) of the C/I distribution in a typical hexagonal cellular layout.

The C/I achieved by any given user is a function of the path loss, which for terrestrial cellular systems increases as r3 to r5, where r is the distance to the radiating source. Furthermore, the path loss is subject to random variations due to man-made or natural obstructions within the path of the radio wave. These random variations are typically modeled as a log normal shadowing random process with a standard deviation of 8 dB. The resulting C/I distribution achieved for a typical hexagonal cellular layout with omni-directional Access Point antennas, r4 propagation law, and shadowing process with 8 dB standard deviation is shown in FIG. 6.

The obtained C/I distribution can only be achieved if, at any instant in time and at any location, the Access Terminal is served by the best Access Point which is defined as that achieving the largest C/I value, regardless of the physical distance to each Access Point. Because of the random nature of the path loss as described above, the signal with the largest C/I value can be one, which is other than the minimum physical distance from the Access Terminal. In contrast, if an Access Terminal was to communicate only via the Access Point of minimum distance, the C/I can be substantially degraded. It is therefore beneficial for Access Terminals to communicate to and from the best serving Access Point at all times, thereby achieving the optimum C/I value. It can also be observed that the range of values of the achieved C/I, in the above idealized model and as shown in FIG. 6, is limited to approximately 1:56 or 15 dB. It is therefore possible for a CDMA Access Point to serve Access Terminals with information bit rates that can vary by as much as a factor of 56, since the following relationship holds:

$$R_b = W \frac{(C/I)}{(E_b/I_o)}, \quad (1)$$

where $R_b$ represents the information rate to a particular Access Terminal, W is the total bandwidth occupied by the spread spectrum signal, and $E_b/I_o$ is the energy per bit over interference density required to achieve a given level of performance. For instance, if the spread spectrum signal occupies a bandwidth W of 1.2288 MHz and reliable communication requires an average $E_b/I_o$ equal to 3 dB, then an Access Terminal, which achieves a C/I value of 3 dB to the best Access Point can communicate at a data rate as high as 1.2288 Mbps. On the other hand, given the parameter values, if an Access Terminal is subject to substantial interference from adjacent Access Points and can only achieve a C/I of −7 dB, reliable communication can not be supported at a rate greater than 122.88 Kbps. A communication system designed to optimize the average throughput will therefore attempt to serve each remote user from the best serving Access Point and at the highest data rate $R_b$, which the remote user can reliably support. A data communication system that exploits the C/I values to improve the data throughput from the CDMA Access Points to the Access Terminals is desired.

In one embodiment, each Access Terminal communicates with one or more Access Points and monitors the control channels for the duration of the communication with the Access Points. The control channels can be used by the Access Points to transmit small amounts of data, paging messages addressed to a specific Access Terminal, and broadcast messages to all Access Terminals. The paging message informs the Access Terminal that the Access Point has a large amount of data to transmit to the Access Terminal.

Upon receipt of the paging messages from one or more Access Points, the Access Terminal measures the signal-to-noise-and-interference ratio (C/I) of the forward link signals (e.g. the forward link pilot signals) at every time slot and selects the best Access Point using a set of parameters, which can comprise the present and previous C/I measurements. The method and apparatus for selecting the best Access Point using a set of parameters is disclosed in U.S. patent application Ser. No. 08/963,386 entitled "METHOD AND APPARATUS FOR HIGH RATE PACKET TRANSMISSION," filed Nov. 3, 1997, now U.S. Pat. No. 6,574,211, issued Jun. 3, 2002 to Padovani et al., previously incorporated by reference.

At every time slot, the Access Terminal transmits to the selected Access Point on a dedicated data request (DRC) channel a request for transmission at the highest data rate, which the measured C/I can reliably support. The request can take different forms. In one embodiment, the request indicates the requested data rate. In one embodiment, the request is a number that indicates the requested data rate. In another embodiment, the request is an index into a table of data rates, thereby indicated the requested data rate. In yet another embodiment, the request indicates the quality of the forward link, which in turn is assessed by the Access Point in order to determine the data rate.

The selected Access Point transmits data, in data packets, at a data rate not exceeding the data rate received from the Access Terminal on the DRC channel. By transmitting from the best Access Point at every time slot, improved throughput and transmission delay are achieved.

The Access Terminal selects the best Access Point candidates for communication based on the procedure described in U.S. patent application Ser. No. 08/790,497, entitled "METHOD AND APPARATUS FOR PERFORMING SOFT HANDOFF IN A WIRELESS COMMUNICATION SYSTEM," filed Jan. 29, 1997, now U.S. Pat. No. 6,151,502, issued Nov. 21, 2000 to Padovani et al., assigned to the assignee of the present invention and incorporated by reference herein. In one embodiment, the Access Point can be added to the active set of the Access Terminal if the received pilot signal is above a predetermined add threshold and dropped from the active set if the pilot signal is below a predetermined drop threshold. In another embodiment, the Access Point can be added to the active set if the additional energy of the Access Point (e.g. as measured by the pilot signal) and the energy of the Access Points already in the active set exceeds a predetermined threshold. An Access Point having transmitted energy comprising an insubstantial amount of the total received energy at the Access Terminal is not added to the active set.

In one embodiment, the Access Terminals transmit the data rate requests on the DRC channel in a manner such that only the selected Access Point among the Access Points in communication with the Access Terminal is able to distinguish the DRC messages, therefore assuring that the forward link transmission at any given time slot is from the selected Access Point. In one embodiment, each Access Point in communication with the Access Terminal is assigned a unique Walsh code. The Access Terminal covers the DRC message with the Walsh code corresponding to the selected Access Point. It would be understood by those skilled in the art that other codes can be used to cover the DRC messages. In one embodiment, a non-Walsh code orthogonal code is used to cover the DRC messages.

In accordance with one embodiment, forward link data transmission occurs from one Access Point to one Access Terminal (see FIG. 1) at or near the maximum data rate that can be supported by the forward link and the system. Reverse link data communication can occur from one Access Terminal to one or more Access Points. The calculation of the maximum data rate for forward link transmission is described in detail below. Data is partitioned into data packets, with each data packet being transmitted over one or more time slots (or slots). At each time slot, the Access Point can direct data transmission to any Access Terminal, which is in communication with the Access Point.

Initially, the Access Terminal establishes communication with an Access Point using a predetermined access procedure. In this connected state, the Access Terminal can receive data and control messages from the Access Point, and is able to transmit data and control messages to the Access Point. The Access Terminal then monitors the forward link for transmissions from the Access Points in the active set of the Access Terminal. The active set contains a list of Access Points in communication with the Access Terminal. Specifically, the Access Terminal measures the signal-to-noise-and-interference ratio (C/I) of the forward link pilot from the Access Points in the active set, as received at the Access Terminal. If the received pilot signal is above a predetermined add threshold or below a predetermined drop threshold, the Access Terminal reports this to the Access Point. Subsequent messages from the Access Point direct the Access Terminal to add or delete the Access Point(s) to or from its active set, respectively.

If there is no data to send, the Access Terminal returns to a dormant state and discontinues transmission of data rate information to the Access Point(s). While the Access Terminal is in the dormant state, the Access Terminal monitors the control channel from one or more Access Points in the active set for paging messages.

If there is data to be transmitted to the Access Terminal, the data is sent by a central controller within the Access Terminal to all Access Points in the active set and stored in a queue at each Access Point. A paging message is then sent by one or more Access Points to the Access Terminal on the respective control channels. The Access Point may transmit all such paging messages at the same time across several Access Points in order to ensure reception even when the Access Terminal is switching between Access Points. The Access Terminal demodulates and decodes the signals on one or more control channels to receive the paging messages.

Upon decoding the paging messages, and for each time slot until the data transmission is completed, the Access Terminal measures the C/I of the forward link signals from the Access Points in the active set, as received at the Access Terminal. The C/I of the forward link signals can be obtained by measuring the respective pilot signals. The Access Terminal then selects the best Access Point based on a set of parameters. The set of parameters can comprise the present and previous C/I measurements and the bit-error-rate or packet-error-rate. In one embodiment, the best Access Point is selected based on the largest C/I measurement. The Access Terminal then identifies the best Access Point and transmits to the selected Access Point a data request message (hereinafter referred to as the DRC message) on the data request channel (hereinafter referred to as the DRC channel). In one embodiment, the DRC message contains the requested data rate. In another embodiment, the DRC message contains an indication of the quality of the forward link channel (e.g., the C/I measurement itself, the bit-error-rate, or the packet-error-rate).

II. System Description

Figure 1:
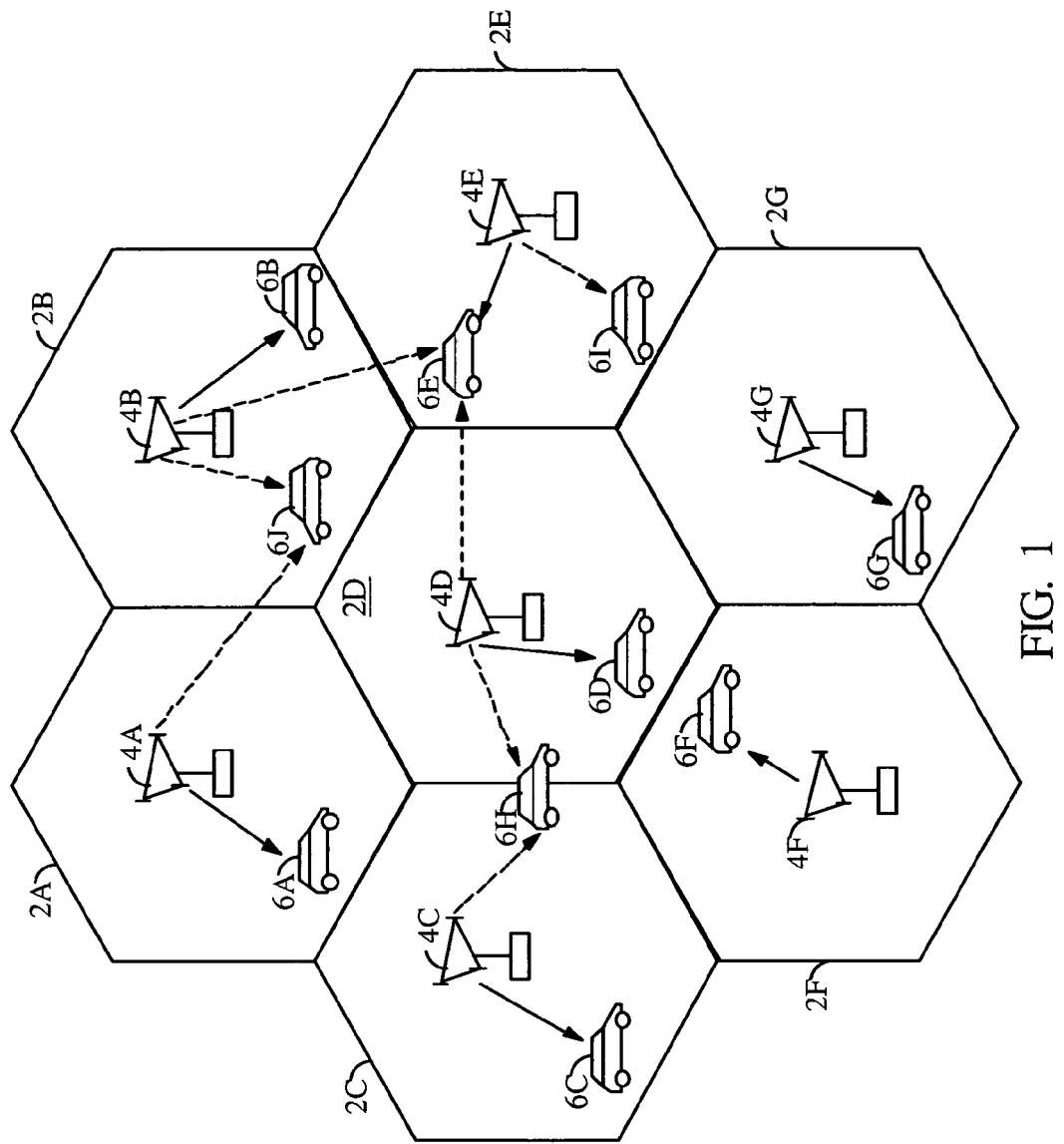
FIG. 1 is a diagram of a data communication system in an embodiment comprising a plurality of cells, a plurality of Access Points and a plurality of Access Terminals.

Referring to the figures, FIG. 1 represents a communication system of one embodiment, which comprises multiple cells 2a-2g. Each cell 2 is serviced by a corresponding Access Point 4. Various Access Terminals 6 are dispersed throughout the data communication system. Each of Access Terminals 6 communicates with at most one Access Point 4 on the forward link at each time slot but can be in communication with one or more Access Points 4 on the reverse link, depending on whether the Access Terminal 6 is in soft handoff. For example, Access Point 4a transmits data exclusively to Access Terminal 6a, Access Point 4b transmits data exclusively to Access Terminal 6b, and Access Point 4c transmits data exclusively to Access Terminal 6c on the forward link at time slot n. In FIG. 1, the solid line with the arrow indicates a data transmission from Access Point 4 to Access Terminal 6. A broken line with the arrow indicates that Access Terminal 6 is receiving the pilot signal, but no data transmission, from Access Point 4. The reverse link communication is not shown in FIG. 1 for simplicity.

As shown by FIG. 1, each Access Point 4 transmits data to one Access Terminal 6 at any given moment. Access Terminals 6, especially those located near a cell boundary, can receive the pilot signals from multiple Access Points 4. If the pilot signal is above a predetermined threshold, Access Terminal 6 can request that Access Point 4 be added to the active set of Access Points 4. Access Terminal 6 can receive data transmission from zero, one, or two or more member(s) of the active set.

Figure 2:
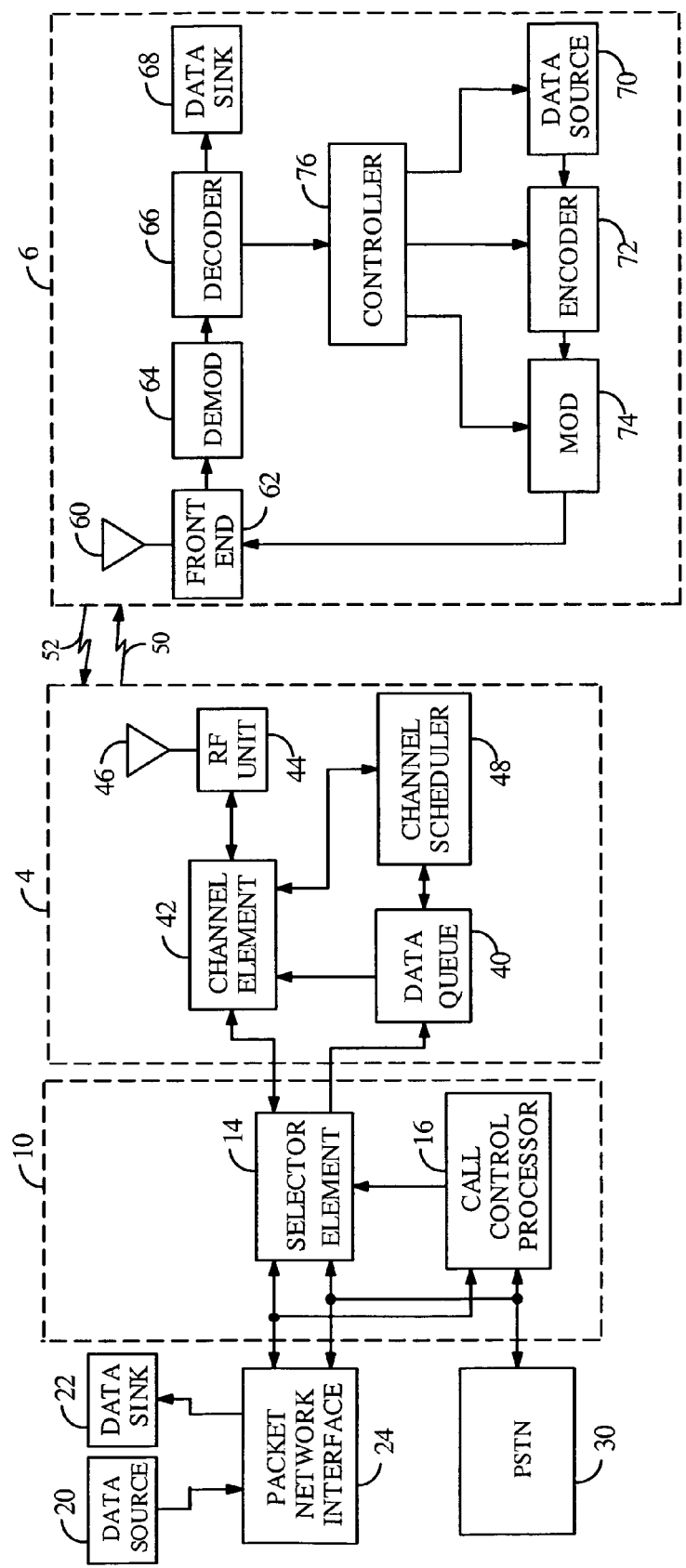
FIG. 2 is a block diagram of subsystems of a data communication system of an embodiment.

A block diagram illustrating the basic subsystems of one embodiment is shown in FIG. 2. Access Point controller 10 interfaces with packet network interface 24, PSTN 30, and all Access Points 4 in the data communication system (only one Access Point 4 is shown in FIG. 2 for simplicity). Access Point controller 10 coordinates the communication between Access Terminals 6 in the data communication system and other users connected to packet network interface 24 and PSTN 30. PSTN 30 interfaces with users through the standard telephone network (not shown in FIG. 2).

Access Point controller 10 contains many selector elements 14, although only one is shown in FIG. 2 for simplicity. One selector element 14 is assigned to control the communication between one or more Access Points 4 and one Access Terminal 6. If selector element 14 has not been assigned to Access Terminal 6, Call control processor 16 is informed of the need to page Access Terminal 6. Call control processor 16 then directs Access Point 4 to page Access Terminal 6.

Data source 20 contains the data, which is to be transmitted to Access Terminal 6. Data source 20 provides the data to packet network interface 24. Packet network interface 24 receives the data and routes the data to selector element 14. Selector element 14 sends the data to each Access Point 4 in communication with Access Terminal 6. Each Access Point 4 maintains data queue 40, which contains the data to be transmitted to Access Terminal 6.

A data packet refers to a predetermined amount of data, which is independent of the data rate. In one embodiment, on the forward link the data packet is formatted with other control and coding bits and encoded. If data transmission occurs over multiple Walsh channels, the encoded packet is demultiplexed into parallel streams, with each stream transmitted over one Walsh channel.

The data is sent in data packets from data queue 40 to channel element 42. For each data packet, channel element 42 inserts the necessary control fields. The data packet, control fields, frame check sequence bits, and code tail bits comprise a formatted packet. Channel element 42 then encodes one or more formatted packets and interleaves (or reorders) the symbols within the encoded packets. Next, the interleaved packet is scrambled with a scrambling sequence, covered with Walsh covers, and spread with the long PN code and the short PNI and PNQ codes. The spread data is quadrature modulated, filtered, and amplified by a transmitter within RF unit 44. The forward link signal is transmitted over the air through antenna 46 on forward link 50.

At Access Terminal 6, the forward link signal is received by antenna 60 and routed to a receiver within front end 62. The receiver filters, amplifies, quadrature demodulates, and quantizes the signal. The digitized signal is provided to demodulator (DEMOD) 64 where it is despread with the long PN code and the short PNI and PNQ codes, decovered with the Walsh covers, and descrambled with the identical scrambling sequence. The demodulated data is provided to decoder 66 which performs the inverse of the signal processing functions done at Access Point 4, specifically the de-interleaving, decoding, and frame check functions. The decoded data is provided to data sink 68. The hardware, as described above, supports transmissions of data, messaging, voice, video and other communications over the forward link.

The system control and scheduling functions can be accomplished by many implementations. The location of channel scheduler 48 is dependent on whether a centralized or distributed control/scheduling processing is desired. For example, for distributed processing, channel scheduler 48 can be located within each Access Point 4. Conversely, for centralized processing, channel scheduler 48 can be located within Access Point controller 10 and can be designed to coordinate the data transmissions of multiple Access Points 4.

Other implementations of the above-described functions can be contemplated and are within the scope of the present invention.

As shown in FIG. 1, Access Terminals 6 are dispersed throughout the data communication system and can be in communication with zero or one Access Point 4 on the forward link. In one embodiment, channel scheduler 48 coordinates the forward link data transmissions of one Access Point 4. In one embodiment, channel scheduler 48 connects to data queue 40 and channel element 42 within Access Point 4 and receives the queue size, which is indicative of the amount of data to transmit to Access Terminal 6. In one embodiment, channel scheduler 48 receives the DRC messages from Access Terminals 6.

In one embodiment, the data communication system supports data and message transmissions on the reverse link. Within Access Terminal 6, controller 76 processes the data or message transmission by routing the data or message to encoder 72. Controller 76 can be implemented in a microcontroller, a microprocessor, a digital signal processing (DSP) chip, or an ASIC programmed to perform the function as described herein.

In one embodiment, encoder 72 encodes the message consistent with the Blank and Burst signaling data format described in the aforementioned U.S. Pat. No. 5,504,773. Encoder 72 then generates and appends a set of CRC bits, appends a set of code tail bits, encodes the data and appended bits, and reorders the symbols within the encoded data. The interleaved data is provided to modulator (MOD) 74.

Modulator 74 can be implemented in many embodiments. In one embodiment (see FIG. 5), the interleaved data is covered with Walsh codes, spread with a long PN code, and further spread with the short PN codes. The spread data is provided to a transmitter within front end 62. The transmitter modulates, filters, amplifies, and transmits the reverse link signal over the air, through antenna 46, on reverse link 52.

In one embodiment, Access Terminal 6 spreads the reverse link data in accordance with a long PN code. Each reverse link channel is defined in accordance with the temporal offset of a common long PN sequence. At two differing offsets the resulting modulation sequences are uncorrelated. The offset of an Access Terminal 6 is determined in accordance with a unique numerical identification of Access Terminal 6, which in one embodiment of the IS-95 Access Terminals 6 is the Access Terminal specific identification number. Thus, each Access Terminal 6 transmits on one uncorrelated reverse link channel determined in accordance with its unique electronic serial number.

At Access Point 4, the reverse link signal is received by antenna 46 and provided to RF unit 44. RF unit 44 filters, amplifies, demodulates, and quantizes the signal and provides the digitized signal to channel element 42. Channel element 42 despreads the digitized signal with the short PN codes and the long PN code. Channel element 42 also performs the Walsh code decovering and pilot and DRC extraction. Channel element 42 then reorders the demodulated data, decodes the de-interleaved data, and performs the CRC check function. The decoded data, e.g. the data or message, is provided to selector element 14. Selector element 14 routes the data and message to the appropriate destination. Channel element 42 may also forward a quality indicator to selector element 14 indicative of the condition of the received data packet.

In one embodiment, the Access Terminal can direct the transmission of the DRC message to a specific Access Point by the use of a Walsh code, which uniquely identifies the Access Point. The DRC message symbols are exclusively ORed (XOR) with the unique Walsh code. Since each Access Point in the active set of the Access Terminal is identified by a unique Walsh code, only the selected Access Point which performs the identical XOR operation as that performed by the Access Terminal, with the correct Walsh code, can correctly decode the DRC message. The Access Point uses the DRC message from each Access Terminal to efficiently transmit forward link data at the highest possible rate.

At each time slot, the Access Point can select any of the paged Access Terminals for data transmission. The Access Point then determines the data rate at which to transmit the data to the selected Access Terminal based on the most recent value of the DRC message received from the Access Terminal. Additionally, the Access Point uniquely identifies a transmission to a particular Access Terminal by using a spreading code, which is unique to that Access Terminal. In one embodiment, this spreading code is the long pseudo noise (PN) code, which is defined by IS-95 standard.

The Access Terminal, for which the data packet is intended, receives the data transmission and decodes the data packet. Each data packet comprises a plurality of data units. In one embodiment, a data unit comprises eight information bits, although different data unit sizes can be defined and are within the scope of the present invention. In one embodiment, each data unit is associated with a sequence number and the Access Terminals are able to identify either missed or duplicative transmissions. In such events, the Access Terminals communicate via the reverse link data channel the sequence numbers of the missing data units. The Access Point controllers, which receive the data messages from the Access Terminals, then indicate to all Access Points communicating with this particular Access Terminal which data units were not received by the Access Terminal. The Access Points then schedule a retransmission of such data units. Each Access Terminal in the data communication system can communicate with multiple Access Points on the reverse link. In one embodiment, the data communication system supports soft handoff and softer handoff on the reverse link for several reasons. First, soft handoff does not consume additional capacity on the reverse link but rather allows the Access Terminals to transmit data at the minimum power level such that at least one of the Access Points can reliably decode the data. Second, reception of the reverse link signals by more Access Points increases the reliability of the transmission and only requires additional hardware at the Access Points.

In one embodiment, the forward link capacity of the data transmission system is determined by the rate requests of the Access Terminals. Additional gains in the forward link capacity can be achieved by using directional antennas and/or adaptive spatial filters. An exemplary method and apparatus for providing directional transmissions are disclosed in U.S. patent application Ser. No. 08/575,049, entitled "METHOD AND APPARATUS FOR DETERMINING THE TRANSMISSION DATA RATE IN A MULTI-USER COMMUNICATION SYSTEM," filed Dec. 20, 1995, now U.S. Pat. No. 5,857,147, issued Jan. 5, 1999 to Gardner et al., and U.S. patent application Ser. No. 08/925,521, entitled "METHOD AND APPARATUS FOR PROVIDING ORTHOGONAL SPOT BEAMS, SECTORS, AND PICOCELLS," filed Sep. 8, 1997, now U.S. Pat. No. 6,285,655, issued Sep. 4, 2001 to Lundby et al., both assigned to the assignee of the present invention and incorporated by reference herein.

In one embodiment, the data transmission is scheduled based in part on the quality of the communication link. An exemplary communication system, which selects the transmission rate based on the link quality is disclosed in U.S. patent application Ser. No. 08/741,320, entitled "METHOD AND APPARATUS FOR PROVIDING HIGH SPEED DATA COMMUNICATIONS IN A CELLULAR ENVIRONMENT," filed Oct. 29, 1996, now U.S. Pat. No. 6,496,543, issued on Dec. 17, 2002 to Zehavi, assigned to the assignee of the present invention and incorporated by reference herein. The scheduling of the data communication can be based on additional considerations such as the GOS of the user, the queue size, the type of data, the amount of delay already experienced, and the error rate of the data transmission. These considerations are described in detail in U.S. patent application Ser. No. 08/798,951, entitled "METHOD AND APPARATUS FOR FORWARD LINK RATE SCHEDULING," filed Feb. 11, 1997, now U.S. Pat. No. 6,335,922, issued Jan. 1, 2002 to Tiedemann et al., and U.S. patent application Ser. No. 08/914,928, entitled "METHOD AND APPARATUS FOR REVERSE LINK RATE SCHEDULING," filed Aug. 20, 1997, now U.S. Pat. No. 5,923,650, issued Jul. 13, 1999 to Chen et al., both of which are assigned to the assignee of the present invention and incorporated by reference herein.

In one embodiment, the data transmission is scheduled based on an Access Terminal initiated forward power control. In another embodiment, the data transmission is scheduled based on an Access Point initiated forward power control.

III. Access Terminal initiated Power Control

In one embodiment, forward power control is initiated by the Access Terminal. The use of Access Terminal initiated power control reduces forward link rate quantization loss (a result of there being finite rates on the forward link).

The Access Terminal reports to the Access Point the excess C/I estimate for the selected rate. The Access Point then reduces its transmit power by an appropriate amount when serving that Access Terminal.

Excess C/I is a result of there being finite data rates on the forward link. The excess C/I measurement is the amount of C/I that is beyond that required to achieve a given performance for a given data rate. The use of the excess C/I measurement enables the reduction of quantization loss due to forward link transmit power being more than is required for a given reliable data rate. In one embodiment, the excess C/I measurement is used to reduce the transmit power on the traffic channel commensurate with the excess C/I measurement. In one embodiment, the excess C/I measurement is used to reduce the transmit power on the pilot channel and traffic channel commensurate with the excess C/I measurement.

An exemplary definition of the supported data rates and decode thresholds are illustrated in Table 1.

It would be understood by those skilled in the art that a different definition of the supported data rates can be contemplated and are within the scope of the present invention. It would also be understood by those skilled in the art that the use of any number of supported data rates and other data rates than those listed in Table 1 can be contemplated and is within the scope of the invention.

Table 1 shows the C/I thresholds required to decode each data rate at a 1% packet error rate (PER). PER=#badpackets/#goodpackets The forward link has a limited rate set and the thresholds required to decode a packet successfully 1% of the time for consecutive rates have a gap of as much as 3.7 dB, for example. Additionally if the estimated C/I is greater than that required for the highest rate the Access Point can reduce its transmit power.

Closer to the cell boundary, excess transmit power of an Access Point causes interference for Access Terminals being served by adjacent Access Points. This interference causes the Access Terminals being served by adjacent Access Points to observe a lower C/I and consequently having a lower forward link data rate. Thus, reducing the transmit power of an Access Point reduces the interference for Access Terminals being served by adjacent Access Points, thereby increasing the C/I measurements of the Access Terminals. The increased C/I measurements of the Access Terminals causes an increase in the requested forward link data rate of the Access Terminals. The increased C/I measurements of the Access Terminals may result in an increase in an effective served data rate.

Once the Access Terminal reports the excess C/I, the Access Point can reduce its transmit power by an appropriate amount when transmitting to that Access Terminal. This ensures that the Access Terminal decodes the requested packet with a 1% PER. In addition, the forward link interference observed by the Access Terminal's in neighboring sectors is reduced.

The DRC channel carries information about the requested rate and the sector that it is requested from. In one embodiment, the DRC message also contains an excess C/I measurement. There are additional bits in the DRC message codeword to indicate the amount of excess C/I. In another embodiment, the excess C/I measurement is included in another message on a separate feedback channel.

Once the Access Point receives an indication of the excess C/I from the Access Terminal, if it chooses to serve that Access Terminal, it reduces its transmit power by an amount equal to the excess C/I indicated by the Access Terminal.

TABLE 1

Traffic Channel Parameters

| Parameter | Data Rates Kbps | | | | | | | | | | |
|---|---|---|---|---|---|---|---|---|---|---|---|
| | 38.4 | 76.8 | 153.6 | 307.2 | 307.2 | 614.4 | 614.4 | 1228.8 | 1228.8 | 1843.2 | 2457.6 |
| 2048 bits | 1024 | 1024 | 1024 | 1024 | 1024 | 1024 | 1024 | 2048 | 2048 | 3072 | 4096 |
| Packet length (msec) | 26.67 | 13.33 | 6.67 | 3.33 | 3.33 | 1.67 | 1.67 | 1.67 | 1.67 | 0.83 | 0.83 |
| Slots/packet | 16 | 8 | 4 | 1 | 2 | 1 | 2 | 1 | 2 | 1 | 0.5 |
| Slots/Transmission | 16 | 8 | 4 | 2 | 2 | 1 | 1 | 1 | 1 | 1 | 1 |
| Threshold (dB) | −11.5 | −9.7 | −6.8 | −3.9 | −3.8 | −0.6 | −0.8 | 1.8 | 3.7 | 7.5 | 9.7 |
| Rate Index | 0 | 1 | 2 | 3 | 4 | 5 | 6 | 7 | 8 | 9 | 10 |

Transmit power at digital baseband is modified in order to reduce the Access Point transmit power.

In one embodiment, the range of excess C/I is from 0.5 dB to 3.5 dB. Assuming 0.5 dB steps and 7 levels, 3 bits represents this information. It would be understood by those skilled in the art that the steps can be any dB increment and that there can be any number of dB levels and are within the scope of the present invention.

IV. Access Point initiated Power Control

In one embodiment, forward power control is performed autonomously at the Access Point. The data transmission is scheduled based on an Access Point initiated forward power control. The Access Point initiated forward power control approach is used to increase the throughput achieved by users that receive a significant amount of interference. The Access Point varies its transmit power over time either randomly or in synchronism with neighboring Access Points in the communication system.

In one embodiment, all Access Points vary their transmit power in a time-synchronized fashion. In another embodiment, all Access Points vary their transmit power in random patterns. In one embodiment, the random pattern is a periodic pattern such as a sinusoidal pattern or a triangular pattern. In another embodiment, the random pattern is an aperiodic pattern. It would be understood by those skilled in the art that the random pattern could be any kind of pattern.

As a result of the variation in transmit power, Access Terminals measure a variable C/I. The Access Terminals send an indication of the variable C/I as a rate request to the Access Point. The Access Point uses the rate request variable C/I in its scheduling algorithms.

In one embodiment, the forward link scheduler, i.e., channel scheduler 48, of the Access Point uses the variation in rate requests to bias its service to Access Terminals when the requested rate of an Access Terminal is higher than the average served rate of the Access Terminal.

In one embodiment, the channel scheduler 48 selects for the next data transmission, the Access Terminal I that has the highest ratio of the instantaneous DRC requested by the Access Terminal to the Average Served Rate for that Access Terminal:

$$DRCI(n)/RI(n), \text{ where } RI(n)=(1-1/tc)*RI(n-1)+(1/tc)$$

RI(n) is the average served rate in slot n−1 to I, and tc is a scheduler time constant. In one embodiment, tc is 1000 slots. It would be understood by those skilled in the art that the time constant could be any positive integer greater than one and depends on the application.

An Access Terminal's C/I is interference limited when the Access Terminal is located at or near cell intersections by the interference from adjacent cells. If the C/I observed at the Access Terminal is time varying, then the Access Terminal would obtain a higher C/I relative to an average C/I for some fraction of the time and a lower C/I relative to the average C/I for the remainder of the time. The Access Point calculates the average C/I from the plurality of C/Is it receives from Access Terminals. The Access Terminals that observe a higher than average C/I are scheduled by the Access Point scheduler. Other factors can be considered in scheduling data transmissions and are within the scope of the present invention.

In the embodiment in which all of the Access Points are changing their transmit power in a synchronized fashion, all sectors of an Access Point are power controlled such that the time that the maximum power occurs depends on the Access Point's boresite azimuth angle:

$$P(t)=P_0(dBm)+\partial(dB)*Cos(2*\pi*t/T-\theta)$$

where, $P_0$ is the Access Point nominal transmit power;

$\theta$ is the Azimuth angle;

T is the time to scan 360° (1 to 2 seconds); and $\partial$=peak, Variation in Pmax=1 to 4 dB.

This results in Access Terminals at (or near) a handoff boundary having a time varying C/I even if they are stationary and their maximum C/I would be better than their average C/I, by a dB. When an Access Point increases its power in the direction of an Access Terminal, the other Access Points around the Access Terminal are decreasing their transmit power. The time period for the power variation is such that it is within a forward link scheduler time-constant. The synchronized approach can be viewed as a process, which dynamically moves the handoff boundary perceived by fixed users, i.e, Access Terminals.

In another embodiment, all Access Points vary their transmit power in random patterns. Access Points vary power randomly i.e. in an uncoordinated fashion.

In one embodiment, total power is controlled. In another embodiment, the pilot channel and the traffic channel are controlled. In another embodiment, only the traffic channel is power controlled.

V. No Handoff Case

In the no handoff case, Access Terminal 6 communicates with one Access Point 4. Referring to FIG. 2, the data destined for a particular Access Terminal 6 is provided to selector element 14, which has been assigned to control the communication with that Access Terminal 6. Selector element 14 forwards the data to data queue 40 within Access Point 4. Access Point 4 queues the data and transmits a paging message on the control channel. Access Point 4 then monitors the reverse link DRC channel for DRC messages from Access Terminal 6. If no signal is detected on the DRC channel, Access Point 4 can retransmit the paging message until the DRC message is detected. After a predetermined number of retransmission attempts, Access Point 4 can terminate the process or re-initiate a call with Access Terminal 6.

In one embodiment, Access Terminal 6 transmits the requested data rate, in the form of a DRC message, to Access Point 4 on the DRC channel. In another embodiment, Access Terminal 6 transmits an indication of the quality of the forward link channel (e.g., the C/I measurement) to Access Point 4. In one embodiment, Access Terminal 6 transmits an excess C/I measurement to Access Point 4.

In one embodiment, the DRC message is 3-bits long and is decoded with soft decisions by Access Point 4. In one embodiment, the DRC message is transmitted within the first half of each time slot. Access Point 4 then has the remaining half of the time slot to decode the DRC message and configure the hardware for data transmission at the next successive time slot, if that time slot is available for data transmission to this Access Terminal 6. If the next successive time slot is not available, Access Point 4 waits for the next available time slot and continues to monitor the DRC channel for the new DRC messages.

In one embodiment, Access Point 4 transmits at the requested data rate. This embodiment confers to Access Terminal 6 the important decision of selecting the data rate. Always transmitting at the requested data rate has the advantage that Access Terminal 6 knows which data rate to expect.

Thus, Access Terminal 6 only demodulates and decodes the traffic channel in accordance with the requested data rate. Access Point 4 does not have to transmit a message to Access Terminal 6 indicating which data rate is being used by Access Point 4.

In one embodiment, after reception of the paging message, Access Terminal 6 continuously attempts to demodulate the data at the requested data rate. Access Terminal 6 demodulates the forward traffic channel and provides soft decision symbols to the decoder. The decoder decodes the symbols and performs the frame check on the decoded packet to determine whether the packet was received correctly. If the packet was received in error or if the packet was directed for another Access Terminal 6, the frame check would indicate a packet error. Alternatively, the Access Terminal 6 demodulates the data on a slot by slot basis. In one embodiment, Access Terminal 6 is able to determine whether a data transmission is directed for it based on a preamble, which is incorporated within each transmitted data packet. Thus, Access Terminal 6 can terminate the decoding process if it is determined that the transmission is directed for another Access Terminal 6. In either case, Access Terminal 6 transmits a negative acknowledgments (NACK) message to Access Point 4 to acknowledge the incorrect reception of the data units. Upon receipt of the NACK message, the data units received in error is retransmitted.

The transmission of the NACK messages can be implemented in a manner similar to the transmission of the error indicator bit (EIB) in the CDMA system. The implementation and use of EIB transmission are disclosed in U.S. Pat. No. 5,568,483, entitled "METHOD AND APPARATUS FOR THE FORMATTING OF DATA FOR TRANSMISSION," assigned to the assignee of the present invention and incorporated by reference herein. Alternatively, NACK can be transmitted with messages.

In one embodiment, the data rate is determined by Access Point 4 with input from Access Terminal 6. Access Terminal 6 performs the C/I measurement and transmits an indication of the link quality (e.g., the C/I measurement) to Access Point 4. In another embodiment, Access Terminal 6 performs an excess C/I measurement and transmits the excess C/I measurement to Access Point 4. Access Point 4 can adjust the requested data rate based on the resources available to Access Point 4, such as the queue size and the available transmit power. The method and apparatus for performing rate determination are described in detail in U.S. patent application Ser. No. 08/730,863, entitled "METHOD AND APPARATUS FOR DETERMINING THE RATE OF RECEIVED DATA IN A VARIABLE RATE COMMUNICATION SYSTEM," filed Oct. 18, 1996, now U.S. Pat. No. 5,751,725, issued May 12, 1998 to Chen, and patent application Ser. No. 08/908,866, also entitled "METHOD AND APPARATUS FOR DETERMINING THE RATE OF RECEIVED DATA IN A VARIABLE RATE COMMUNICATION SYSTEM," filed Aug. 8, 1997, now U.S. Pat. No. 6,175,590, issued Jan. 16, 2001 to Stein, both assigned to the assignee of the present invention and incorporated by reference herein. Access Terminal 6 transmits a NACK message as described above if the outcome of the frame check is negative.

VI. Handoff Case

In the handoff case, Access Terminal 6 communicates with multiple Access Points 4 on the reverse link. The Access Terminal initiated power control operates independent of handoff. In handoff, an Access Terminal is switched from being served by one Access Point to being served by another Access Point. At any time, the transmit power of the Access Point serving the Access Terminal is reduced according to the excess C/I measured by the Access Terminal being served by the Access Point.

The Access Point initiated power control also operates independent of handoff. An Access Terminal is served by the Access Point with which the Access Terminal measures the highest received C/I. That Access Point schedules forward link data to the Access Terminal when the Access Terminal's requested rate is higher than the Access Terminal's served rate.

In one embodiment, data transmission on the forward link to a particular Access Terminal 6 occurs from one Access Point 4. However, Access Terminal 6 can simultaneously receive the pilot signals from multiple Access Points 4. If the C/I measurement of an Access Point 4 is above a predetermined threshold, the Access Point 4 is added to the active set of Access Terminal 6. During the soft handoff direction message, the new Access Point 4 assigns Access Terminal 6 to a reverse power control (RPC) Walsh channel which is described below. Each Access Point 4 in soft handoff with Access Terminal 6 monitors the reverse link transmission and sends an RPC bit on their respective RPC Walsh channels.

Referring to FIG. 2, selector element 14 assigned to control the communication with Access Terminal 6 forwards the data to all Access Points 4 in the active set of Access Terminal 6. All Access Points 4, which receive data from selector element 14 transmit a paging message to Access Terminal 6 on their respective control channels. When Access Terminal 6 is in the connected state, Access Terminal 6 performs two functions. First, Access Terminal 6 selects the best Access Point 4 based on a set of parameters, which can be the best C/I measurement. Access Terminal 6 then selects a data rate corresponding to the C/I measurement. In one embodiment, Access Terminal 6 transmits a DRC message to the selected Access Point 4. Access Terminal 6 can direct transmission of the DRC message to a particular Access Point 4 by covering the DRC message with the Walsh cover assigned to that particular Access Point 4. In another embodiment, Access Terminal 6 transmits an excess C/I measurement to the particular Access Point 4.

Access Terminal 6 attempts to demodulate the forward link signal in accordance with the requested data rate at each subsequent time slot. After transmitting the paging messages, all Access Points 4 in the active set monitor the DRC channel for a DRC message from Access Terminal 6. Again, because the DRC message is covered with a Walsh code, the selected Access Point 4 assigned with the identical Walsh cover is able to decover the DRC message. Upon receipt of the DRC message, the selected Access Point 4 transmits data to Access Terminal 6 at the next available time slots.

In one embodiment, Access Point 4 transmits data in packets comprising a plurality of data units at the requested data rate to Access Terminal 6. If the data units are incorrectly received by Access Terminal 6, a NACK message is transmitted on the reverse links to all Access Points 4 in the active set. In one embodiment, the NACK message is demodulated and decoded by Access Points 4 and forwarded to selector element 14 for processing. Upon processing of the NACK message, the data units are retransmitted using the procedure as described above. In one embodiment, selector element 14 combines the NACK signals received from all Access Points 4 into one NACK message and sends the NACK message to all Access Points 4 in the active set.

In one embodiment, Access Terminal 6 can detect changes in the best C/I measurement and dynamically request data transmissions from different Access Points 4 at each time slot to improve efficiency. Since in one embodiment, data transmission occurs from only one Access Point 4 at any given time slot, other Access Points 4 in the active set may not be aware which data units, if any, has been transmitted to Access Terminal 6. In one embodiment, the transmitting Access Point 4 informs selector element 14 of the data transmission. Selector element 14 then sends a message to all Access Points 4 in the active set. In one embodiment, the transmitted data is presumed to have been correctly received by Access Terminal 6. Therefore, if Access Terminal 6 requests data transmission from a different Access Point 4 in the active set, the new Access Point 4 transmits the remaining data units. In one embodiment, the new Access Point 4 transmits in accordance with the last transmission update from selector element 14. Alternatively, the new Access Point 4 selects the next data units to transmit using predictive schemes based on metrics such as the average transmission rate and prior updates from selector element 14. These mechanisms minimize duplicative retransmissions of the same data units by multiple Access Points 4 at different time slots, which results in a loss in efficiency. If a prior transmission was received in error, Access Points 4 can retransmit those data units out of sequence since each data unit is identified by a unique sequence number as described below. In one embodiment, if a hole (or non-transmitted data units) is created (e.g., as the result of handoff between one Access Point 4 to another Access Point 4), the missing data units are considered as though received in error. Access Terminal 6 transmits NACK messages corresponding to the missing data units and these data units are retransmitted.

In one embodiment, each Access Point 4 in the active set maintains an independent data queue 40, which contains the data to be transmitted to Access Terminal 6. The selected Access Point 4 transmits data existing in its data queue 40 in a sequential order, except for retransmissions of data units received in error and signaling messages. In one embodiment, the transmitted data units are deleted from queue 40 after transmission.

VII. Forward Link Traffic Channel

Figure 3A:
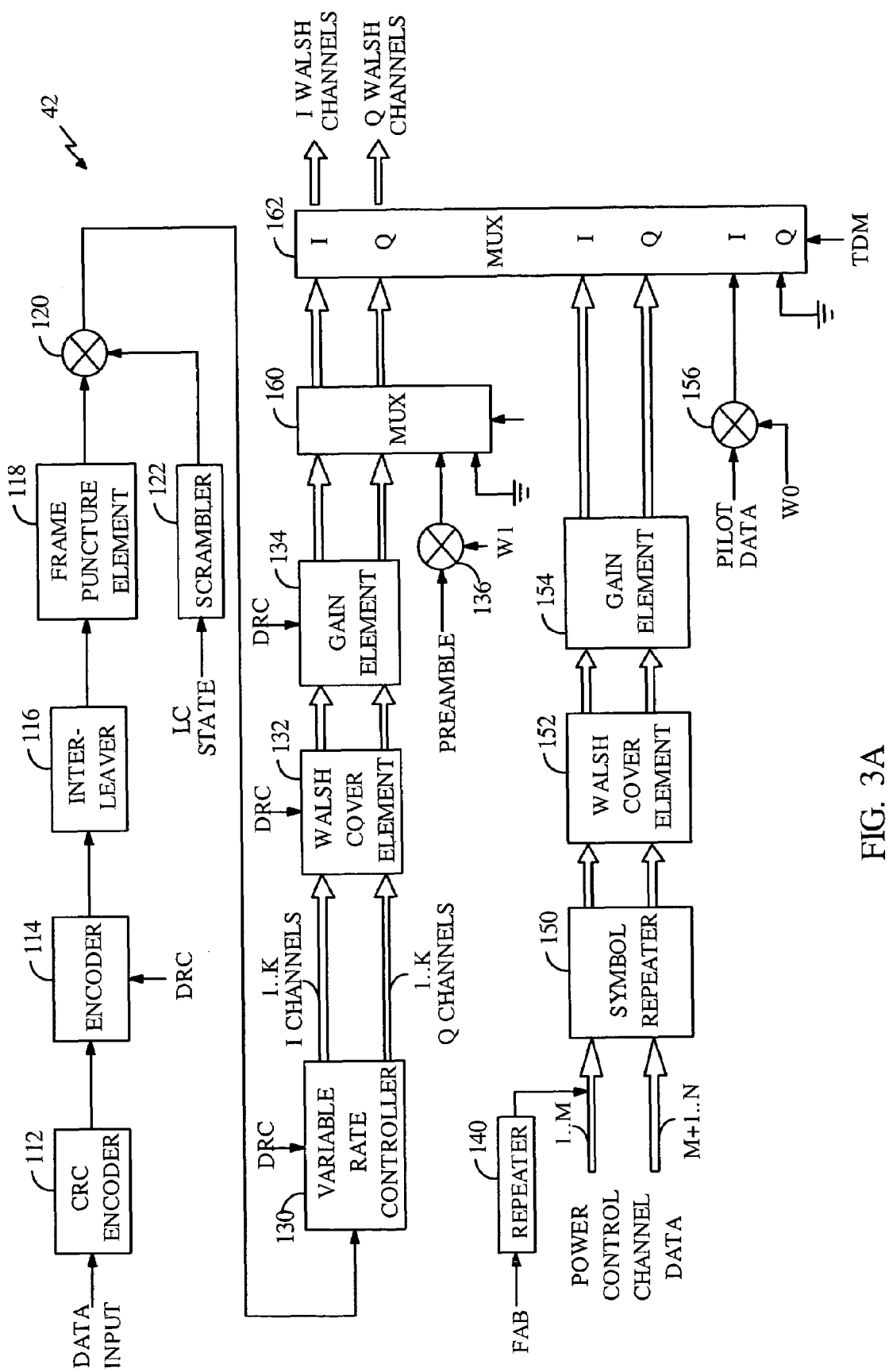
FIGS. 3A-3B are block diagrams of one forward link architecture of an embodiment.

A block diagram of one forward link architecture of one embodiment is shown in FIG. 3A. The data is partitioned into data packets and provided to CRC encoder 112. For each data packet, CRC encoder 112 generates frame check bits (e.g., the CRC parity bits) and inserts the code tail bits. The formatted packet from CRC encoder 112 comprises the data, the frame check and code tail bits, and other overhead bits, which are described below. The formatted packet is provided to encoder 114 which, in one embodiment, encodes the packet in accordance with the encoding format disclosed in the aforementioned U.S. patent application Ser. No. 08/743,688, now U.S. Pat. No. 5,933,462. Other encoding formats can also be used and are within the scope of the present invention. The encoded packet from encoder 114 is provided to interleaver 116, which reorders the code symbols in the packet. The interleaved packet is provided to frame puncture element 118, which removes a fraction of the packet in the manner, described below. The punctured packet is provided to multiplier 120, which scrambles the data with the scrambling sequence from scrambler 122. Puncture element 118 and scrambler 122 are described in detail below. The output from multiplier 120 comprises the scrambled packet.

The scrambled packet is provided to variable rate controller 130, which demultiplexes the packet into K parallel inphase and quadrature channels, where K is dependent on the data rate. In one embodiment, the scrambled packet is first demultiplexed into the inphase (I) and quadrature (Q) streams. In one embodiment, the I stream comprises even indexed symbols and the Q stream comprises odd indexed symbol. Each stream is further demultiplexed into K parallel channels such that the symbol rate of each channel is fixed for all data rates. The K channels of each stream are provided to Walsh cover element 132, which covers each channel with a Walsh function to provide orthogonal channels. The orthogonal channel data are provided to gain element 134 which scales the data to maintain a constant total-energy-per-chip (and hence constant output power) for all data rates. The scaled data from gain element 134 is provided to multiplexer (MUX) 160, which multiplexes the data with the preamble. The preamble is discussed in detail below. The output from MUX 160 is provided to multiplexer (MUX) 162, which multiplexes the traffic data, the power control bits, and the pilot data. The output of MUX 162 comprises the I Walsh channels and the Q Walsh channels.

Figure 3B:
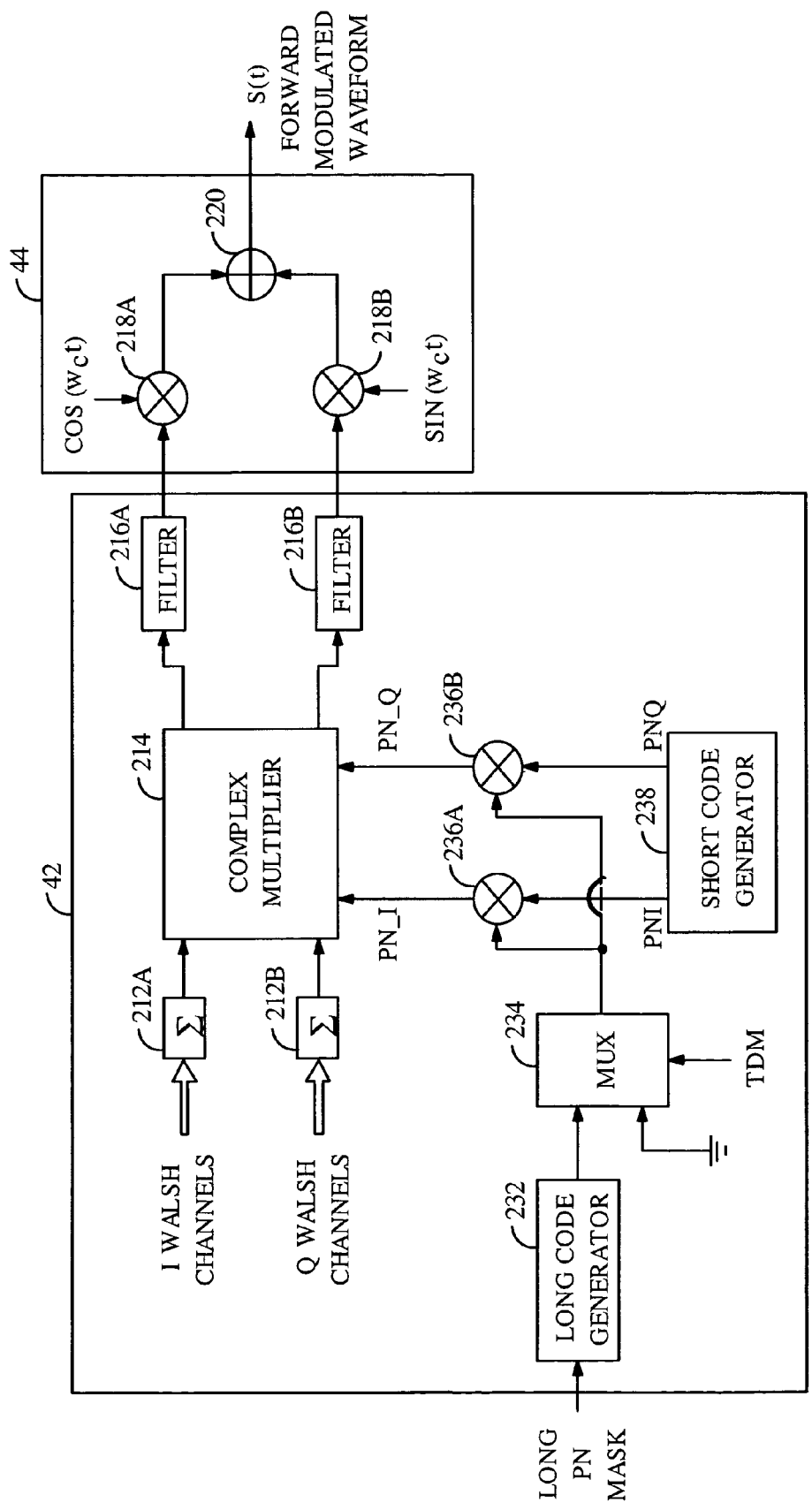

A block diagram of one modulator used to modulate the data is illustrated in FIG. 3B. The I Walsh channels and Q Walsh channels are provided to summers 212a and 212b, respectively, which sum the K Walsh channels to provide the signals Isum and Qsum, respectively. The Isum and Qsum signals are provided to complex multiplier 214. Complex multiplier 214 also receives the PN_I and PN_Q signals from multipliers 236a and 236b, respectively, and multiplies the two complex inputs in accordance with the following equation:

$$(I_{mult} + jQ_{mult}) = (I_{sum} + jQ_{sum}) \cdot (PN\_I + jPN\_Q) \quad (2)$$
$$= (I_{sum} \cdot PN\_I - Q_{sum} \cdot PN\_Q) + $$
$$j(I_{sum} \cdot PN\_Q + Q_{sum} \cdot PN\_I)$$

where $I_{mult}$ and $Q_{mult}$ are the outputs from complex multiplier 214 and j is the complex representation. The $I_{mult}$ and $Q_{mult}$ signals are provided to filters 216a and 216b, respectively, which filters the signals. The filtered signals from filters 216a and 216b are provided to multipliers 218a and 218b, respectively, which multiplies the signals with the inphase sinusoid $COS(w_c t)$ and the quadrature sinusoid $SIN(w_c t)$, respectively. The I modulated and Q modulated signals are provided to summer 220 which sums the signals to provide the forward modulated waveform S(t).

In one embodiment, the data packet is spread with the long PN code and the short PN codes. The long PN code scrambles the packet such that only the Access Terminal 6 for which the packet is destined is able to descramble the packet. In one embodiment, the pilot and power control bits and the control channel packet are spread with the short PN codes but not the long PN code to allow all Access Terminals 6 to receive these bits. The long PN sequence is generated by long code generator 232 and provided to multiplexer (MUX) 234. The long PN mask determines the offset of the long PN sequence and is uniquely assigned to the destination Access Terminal 6. The output from MUX 234 is the long PN sequence during the data portion of the transmission and zero otherwise (e.g. during the pilot and power control portion). The gated long PN sequence from MUX 234 and the short PNI and PNQ sequences from short code generator 238 are provided to multipliers 236a and 236b, respectively, which multiply the two sets of sequences to form the PN_I and PN_Q signals, respectively. The PN_I and PN_Q signals are provided to complex multiplier 214.

The block diagram of one traffic channel shown in FIGS. 3A and 3B is one of numerous architectures, which support data encoding and modulation on the forward link. Other architectures, such as the architecture for the forward link traffic channel in the CDMA system, which conforms to the IS-95 standard, can also be utilized and are within the scope of the present invention.

In one embodiment, the data rates supported by Access Points 4 are predetermined and each supported data rate is assigned a unique rate index. Access Terminal 6 selects one of the supported data rates based on the C/I measurement. Since the requested data rate needs to be sent to an Access Point 4 to direct that Access Point 4 to transmit data at the requested data rate, a trade off is made between the number of supported data rates and the number of bits needed to identify the requested data rate. In one embodiment, the number of supported data rates is seven and a 3-bit rate index is used to identify the requested data rate. It would be understood by those skilled in the art that the number of supported data rates and an n-bit rate index can be contemplated and within the scope of the present invention.

In one embodiment, the minimum data rate is 38.4 Kbps and the maximum data rate is 2.4576 Mbps. The minimum data rate is selected based on the worse case C/I measurement in the system, the processing gain of the system, the design of the error correcting codes, and the desired level of performance. In one embodiment, the supported data rates are chosen such that the difference between successive supported data rates is 3 dB. The 3 dB increment is a compromise among several factors, which include the accuracy of the C/I measurement that can be achieved by Access Terminal 6, the losses (or inefficiencies) which results from the quantization of the data rates based on the C/I measurement, and the number of bits (or the bit rate) needed to transmit the requested data rate from Access Terminal 6 to Access Point 4. More supported data rates require more bits to identify the requested data rate but allows for more efficient use of the forward link because of smaller quantization error between the calculated maximum data rate and the supported data rate.

In one embodiment, the traffic channel transmission is partitioned into frames. The frames in one embodiment are defined as the length of the short PN sequences or 26.67 msec. Each frame can carry control channel information addressed to all Access Terminals 6 (control channel frame), traffic data addressed to a particular Access Terminal 6 (traffic frame), or can be empty (idle frame). The content of each frame is determined by the scheduling performed by the transmitting Access Point 4. In one embodiment, each frame comprises 16 time slots, with each time slot having a duration of 1.667 msec. A time slot of 1.667 msec is adequate to enable Access Terminal 6 to perform the C/I measurement of the forward link signal. A time slot of 1.667 msec also represents a sufficient amount of time for efficient packet data transmission. In one embodiment, each time slot is further partitioned into four quarter slots.

In one embodiment, each data packet is transmitted over one or more time slots as shown in Table 1. In one embodiment, each forward link data packet comprises 1024 or 2048 bits. Thus, the number of time slots required to transmit each data packet is dependent on the data rate and ranges from 16 time slots for the 38.4 Kbps rate to 1 time slot for the 1.2288 Mbps rate and higher.

An exemplary diagram of the forward link slot structure of one embodiment is shown in FIG. 4A. In one embodiment, each slot comprises three of the four time multiplexed channels, the traffic channel, the control channel, the pilot channel, and the power control channel. In one embodiment, the pilot and power control channels are transmitted in two pilot and power control bursts, which are located at the same positions in each time slot. A description of the pilot and power control bursts is disclosed in U.S. patent application Ser. No. 08/963,386 entitled "METHOD AND APPARATUS FOR HIGH RATE PACKET TRANSMISSION," filed Nov. 3, 1997, now U.S. Pat. No. 6,574,211, issued Jun. 3, 2002, previously incorporated by reference.

VIII. Forward Link Pilot Channel

In one embodiment, a forward link pilot channel provides a pilot signal, which is used by Access Terminals 6 for initial acquisition, phase recovery, timing recovery, and ratio combining. These uses are similar to that of the CDMA communication systems, which conform to IS-95 standard. In one embodiment, the pilot signal is also used by Access Terminals 6 to perform the C/I measurement.

A block diagram of the forward link pilot channel in one embodiment is shown in FIG. 3A. The pilot data comprises a sequence of all zeros (or all ones) which is provided to multiplier 156. Multiplier 156 covers the pilot data with Walsh code W0. Since Walsh code W0 is a sequence of all zeros, the output of multiplier 156S is the pilot data. The pilot data is time multiplexed by MUX 162 and provided to the I Walsh channel which is spread by the short PNI code within complex multiplier 214 (see FIG. 3B). In one embodiment, the pilot data is not spread with the long PN code, which is gated off during the pilot burst by MUX 234, to allow reception by all Access Terminals 6. The pilot signal is thus an unmodulated BPSK signal.

A diagram illustrating the pilot signal is shown in FIG. 4A. In one embodiment, each time slot comprises two pilot bursts 306a and 306b, which occur at the end of the first and third quarters of the time slot. In one embodiment, each pilot burst 306 is 64 chips in duration (Tp=64 chips). In the absence of traffic data or control channel data, Access Point 4 only transmits the pilot and power control bursts, resulting in a discontinuous waveform bursting at the periodic rate of 1200 Hz.

IX. Reverse Link Power Control Bit Gain

In one embodiment, the forward link power control channel is used to send the power control command which is used to control the transmit power of the reverse link transmission from remote station 6. On the reverse link, each transmitting Access Terminal 6 acts as a source of interference to all other Access Terminals 6 in the network. To minimize interference on the reverse link and maximize capacity, the transmit power of each Access Terminal 6 is controlled by two power control loops. In one embodiment, the power control loops are similar to that of the CDMA system disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM," assigned to the assignee of the present invention and incorporated by reference herein. Other power control mechanism can also be contemplated and are within the scope of the present invention.

The first power control loop adjusts the transmit power of Access Terminal 6 such that the reverse link signal quality is maintained at a set level. The signal quality is measured as the energy-per-bit-to-noise-plus-interference ratio Eb/Io of the reverse link signal received at Access Point 4. The set level is referred to as the Eb/Io set point. The second power control loop adjusts the set point such that the desired level of performance, as measured by the frame-error-rate (FER), is maintained. Power control is critical on the reverse link because the transmit power of each Access Terminal 6 is an interference to other Access Terminals 6 in the communication system. Minimizing the reverse link transmit power reduces the interference and increases the reverse link capacity.

Within the first power control loop, the $E_b/I_o$ of the reverse link signal is measured at Access Point 4. Access Point 4 then compares the measured Eb/Io with the set point. If the measured Eb/Io is greater than the set point, Access Point 4 transmits a power control message to Access Terminal 6 to decrease the transmit power. Alternatively, if the measured Eb/Io is below the set point, Access Point 4 transmits a power control message to Access Terminal 6 to increase the transmit power. In one embodiment, the power control message is implemented with one power control bit. In one embodiment, a high value for the power control bit commands Access Terminal 6 to increase its transmit power and a low value commands Access Terminal 6 to decrease its transmit power.

In one embodiment, the power control bits for all Access Terminals 6 in communication with each Access Point 4 are transmitted on the power control channel. In one embodiment, the power control channel comprises up to 32 orthogonal channels, which are spread with the 16-bit Walsh covers. Each Walsh channel transmits one reverse power control (RPC) bit or one FAC bit at periodic intervals. Each active Access Terminal 6 is assigned an RPC index which defines the Walsh cover and QPSK modulation phase (e.g. inphase or quadrature) for transmission of the RPC bit stream destined for that Access Terminal 6. In one embodiment, the RPC index of 0 is reserved for the FAC bit.

One block diagram of the power control channel is shown in FIG. 3A. The RPC bits are provided to symbol repeater 150, which repeats each RPC bit a predetermined number of times. The repeated RPC bits are provided to Walsh cover element 152, which covers the bits with the Walsh covers corresponding to the RPC indices. The covered bits are provided to gain element 154. In one embodiment, gain element 154 scales the bits prior to modulation so as to maintain a constant total transmit power. In one embodiment, the gains of the RPC Walsh channels are normalized so that the total RPC channel power is equal to the total available transmit power. The gains of the Walsh channels can be varied as a function of time for efficient utilization of the total Access Point transmit power while maintaining reliable RPC transmission to all active Access Terminals 6. In one embodiment, the Walsh channel gains of inactive Access Terminals 6 are set to zero. Automatic power control of the RPC Walsh channels is possible using estimates of the forward link quality measurement from the corresponding DRC channel from Access Terminals 6. The scaled RPC bits from gain element 154 are provided to MUX 162.

In one embodiment, the RPC indices of 0 through 15 are assigned to Walsh covers W0 through W15, respectively, and are transmitted around the first pilot burst within a slot (RPC bursts 304a and 304b in FIG. 4B). The RPC indices of 16 through 31 are assigned to Walsh covers W0 through W15, respectively, and are transmitted around the second pilot burst within a slot (RPC bursts 308a and 308b in FIG. 4B). In one embodiment, the RPC bits are BPSK modulated with the even Walsh covers (e.g., W0, W2, W4, etc.) modulated on the inphase signal and the odd Walsh covers (e.g., W1, W3, W5, etc.) modulated on the quadrature signal. To reduce the peak-to-average envelope, it is preferable to balance the inphase and quadrature power. Furthermore, to minimize cross-talk due to demodulator phase estimate error, it is preferable to assign orthogonal covers to the inphase and quadrature signals.

In one embodiment, up to 31 RPC bits can be transmitted on 31 RPC Walsh channels in each time slot. In one embodiment, 15 RPC bits are transmitted on the first half slot and 16 RPC bits are transmitted on the second half slot. The RPC bits are combined by summers 212a and 212b (see FIG. 3B) and the composite waveform of the power control channel is as shown is in FIG. 4B.

A timing diagram of the power control channel is illustrated in FIG. 4A. In one embodiment, the RPC bit rate is 600 bps, or one RPC bit per time slot. Each RPC bit is time multiplexed and transmitted over two RPC bursts (e.g., RPC bursts 304a and 304b), as shown in FIGS. 4A and 4B. In one embodiment, each RPC burst is 32 PN chips (or 2 Walsh symbols) in width (Tpc=32 chips) and the total width of each RPC bit is 64 PN chips (or 4 Walsh symbols). Other RPC bit rates can be obtained by changing the number of symbol repetition. For example, an RPC bit rate of 1200 bps (to support up to 63 Access Terminals 6 simultaneously or to increase the power control rate) can be obtained by transmitting the first set of 31 RPC bits on RPC bursts 304a and 304b and the second set of 32 RPC bits on RPC bursts 308a and 308b. In this case, all Walsh covers are used in the inphase and quadrature signals.

The power control channel has a bursty nature since the number of Access Terminals 6 in communication with each Access Point 4 can be less than the number of available RPC Walsh channels. In this situation, some RPC Walsh channels are set to zero by proper adjustment of the gains of gain element 154.

In one embodiment, the RPC bits are transmitted to Access Terminals 6 without coding or interleaving to minimize processing delays. Furthermore, the erroneous reception of the power control bit is not detrimental to the data communication system since the error can be corrected in the next time slot by the power control loop.

In one embodiment, Access Terminals 6 can be in soft handoff with multiple Access Points 4 on the reverse link. The method and apparatus for the reverse link power control for Access Terminal 6 in soft handoff is disclosed in the aforementioned U.S. Pat. No. 5,056,109. Access Terminal 6 in soft handoff monitors the RPC Walsh channel for each Access Point 4 in the active set and combines the RPC bits in accordance with the method disclosed in the aforementioned U.S. Pat. No. 5,056,109. In one embodiment, Access Terminal 6 performs the logic OR of the down power commands. Access Terminal 6 decreases the transmit power if any one of the received RPC bits commands Access Terminal 6 to decrease the transmit power. In one embodiment, Access Terminal 6 in soft handoff can combine the soft decisions of the RPC bits before making a hard decision. Other embodiments for processing the received RPC bits can be contemplated and are within the scope of the present invention.

In one embodiment, the FAC bit indicates to Access Terminals 6 whether or not the traffic channel of the associated pilot channel will be transmitting on the next half frame. The use of the FAC bit improves the C/I estimate by Access Terminals 6, and hence the data rate request, by broadcasting the knowledge of the interference activity. In one embodiment, the FAC bit only changes at half frame boundaries and is repeated for eight successive time slots, resulting in a bit rate of 75 bps.

Using the FAC bit, Access Terminals 6 can compute the C/I measurement as follows:

$$\left(\frac{C}{I}\right)_i = \frac{C_i}{I - \sum_{j \neq i}(1 - \alpha_j)C_j}, \tag{3}$$

where $(C/I)_i$ is the C/I measurement of the $i^{th}$ forward link signal, $C_i$ is the total received power of the $i^{th}$ forward link signal, $C_j$ is the received power of the $j^{th}$ forward link signal, I is the total interference if all Access Points 4 are transmitting, $\alpha_j$ is the FAC bit of the $j^{th}$ forward link signal and can be 0 or 1 depending on the FAC bit.

X. Reverse Link Architecture

In the data communication system of one embodiment, the reverse link transmission differs from the forward link transmission in several ways. On the forward link, data transmission typically occurs from one Access Point 4 to one Access Terminal 6. However, on the reverse link, each Access Point 4 can concurrently receive data transmissions from multiple Access Terminals 6. In one embodiment, each Access Terminal 6 can transmit at one of several data rates depending on the amount of data to be transmitted to Access Point 4. This system design reflects the asymmetric characteristic of data communication.

In one embodiment, the time base unit on the reverse link is identical to the time base unit on the forward link. In one embodiment, the forward link and reverse link data transmissions occur over time slots, which are 1.667 msec in duration. However, since data transmission on the reverse link typically occurs at a lower data rate, a longer time base unit can be used to improve efficiency.

In one embodiment, the reverse link supports variable rate data transmission. The variable rate provides flexibility and allows Access Terminals 6 to transmit at one of several data rates, depending on the amount of data to be transmitted to Access Point 4. In one embodiment, Access Terminal 6 can transmit data at the lowest data rate at any time. In one embodiment, data transmission at higher data rates requires a grant by Access Point 4. This implementation minimizes the reverse link transmission delay while providing efficient utilization of the reverse link resource.

In one embodiment, the reverse link supports two channels: the pilot/DRC channel and the data channel. The function and implementation of each of these channel are described below. The pilot/DRC channel is used to transmit the pilot signal and the DRC messages and the data channel is used to transmit traffic data.

In one embodiment, Access Terminal 6 transmits a DRC message on the pilot/DRC channel at each time slot whenever Access Terminal 6 is receiving high speed data transmission. Alternatively, when Access Terminal 6 is not receiving a high speed data transmission, the entire slot on the pilot/DRC channel comprises the pilot signal. The pilot signal is used by the receiving Access Point 4 for a number of functions: as an aid to initial acquisition, as a phase reference for the pilot/DRC and the data channels, and as the source for the closed loop reverse link power control.

In one embodiment, the bandwidth of the reverse link is selected to be 1.2288 MHz. This bandwidth selection allows the use of existing hardware designed for a CDMA system, which conforms to the IS-95 standard. However, other bandwidths can be utilized to increase capacity and/or to conform to system requirements. In one embodiment, the same long PN code and short PNI and PNQ codes as those specified by the IS-95 standard are used to spread the reverse link signal. In one embodiment, the reverse link channels are transmitted using QPSK modulation. Alternatively, OQPSK modulation can be used to minimize the peak-to-average amplitude variation of the modulated signal, which can result in improved performance. The use of different system bandwidth, PN codes, and modulation schemes can be contemplated and are within the scope of the present invention.

In one embodiment, the transmit power of the reverse link transmissions on the pilot/DRC channel and the data channel are controlled such that the Eb/Io of the reverse link signal, as measured at Access Point 4, is maintained at a predetermined Eb/Io set point as discussed in the aforementioned U.S. Pat. No. 5,506,109. The power control is maintained by Access Points 4 in communication with the Access Terminal 6 and the commands are transmitted as the RPC bits as discussed above.

XI. Reverse Link Data Channel

Figure 5:
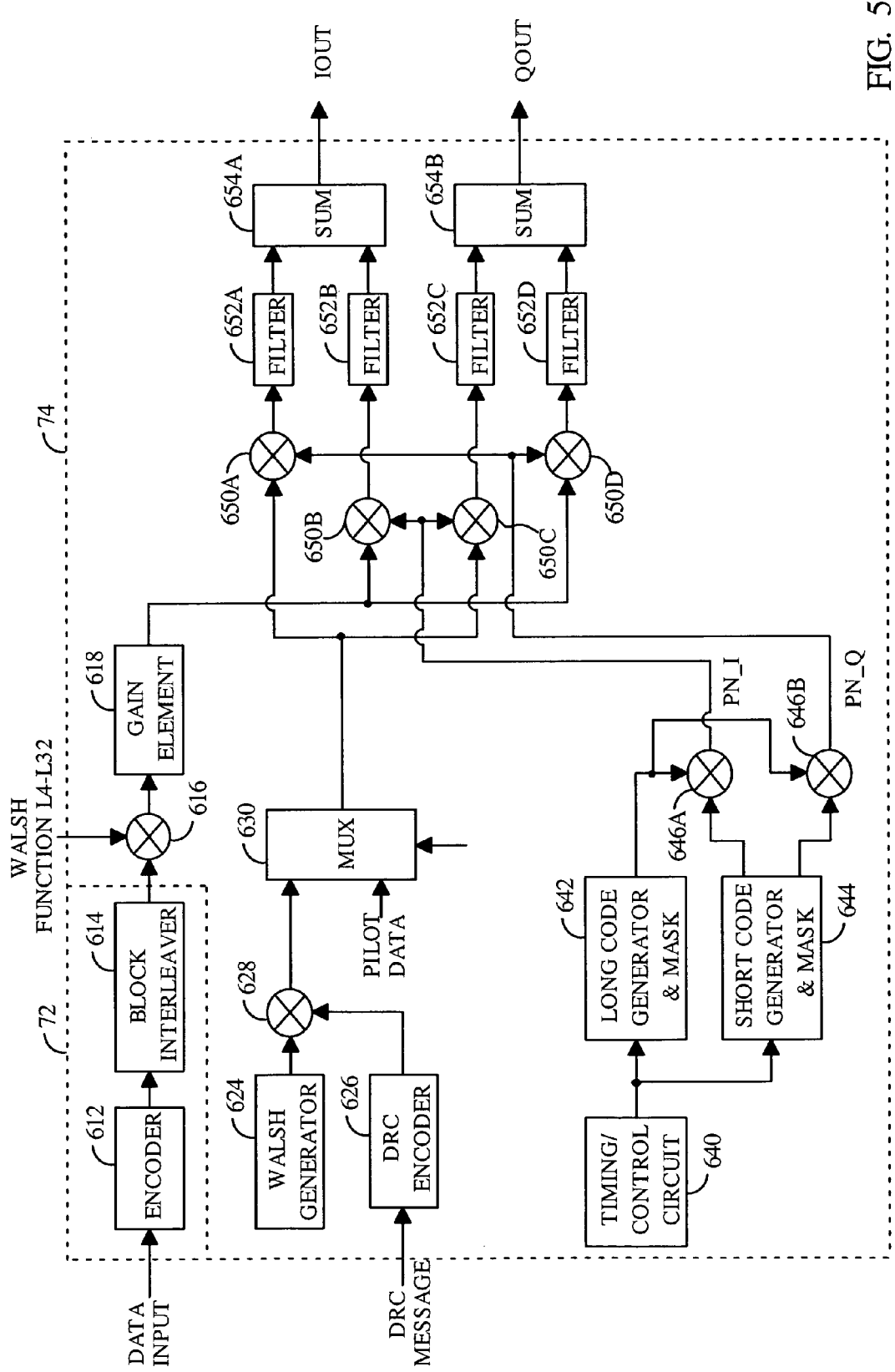
FIG. 5 is a block diagram of one reverse link architecture of an embodiment.

A block diagram of one reverse link architecture of one embodiment is shown in FIG. 5. The data is partitioned into data packets and provided to encoder 612. For each data packet, encoder 612 generates the CRC parity bits, inserts the code tail bits, and encodes the data. In one embodiment, encoder 612 encodes the packet in accordance with the encoding format disclosed in the aforementioned U.S. patent application Ser. No. 08/743,688, now U.S. Pat. No. 5,933,462. Other encoding formats can also be used and are within the scope of the present invention. The encoded packet from encoder 612 is provided to block interleaver 614, which reorders the code symbols in the packet. The interleaved packet is provided to multiplier 616, which covers the data with the Walsh cover and provides the covered data to gain element 618. Gain element 618 scales the data to maintain a constant energy-per-bit Eb regardless of the data rate. The scaled data from gain element 618 is provided to multipliers 650b and 650d which spread the data with the PN_Q and PN_I sequences, respectively. The spread data from multipliers 652b and 650d are provided to filters 652b and 652d, respectively, which filter the data. The filtered signals from filters 652a and 652b are provided to summer 654a and the filtered signals from filter 652c and 652d are provided to summer 654b. Summers 654a and 654b sum the signals from the data channel with the signals from the pilot/DRC channel. The outputs of summers 654a and 654b comprise IOUT and QOUT, respectively, which are modulated with the inphase sinusoid COS(wct) and the quadrature sinusoid SIN(wct), respectively (as in the forward link), and summed (not shown in FIG. 5). In one embodiment, the traffic data is transmitted on both the inphase and quadrature phase of the sinusoid.

In one embodiment, the data is spread with the long PN code and the short PN codes. The long PN code scrambles the data such that the receiving Access Point 4 is able to identify the transmitting Access Terminal 6. The short PN code spreads the signal over the system bandwidth. The long PN sequence is generated by long code generator 642 and provided to multipliers 646a and 646b. The short PNI and PNQ sequences are generated by short code generator 644 and also provided to multipliers 646a and 646b, respectively, which multiply the two sets of sequences to form the PN_I and PN_Q signals, respectively. Timing/control circuit 640 provides the timing reference.

One block diagram of the data channel architecture as shown in FIG. 5 is one of numerous architectures which support data encoding and modulation on the reverse link. For high rate data transmission, an architecture similar to that of the forward link utilizing multiple orthogonal channels can also be used. Other architectures, such as the architecture for the reverse link traffic channel in the CDMA system, which conforms to the IS-95 standard, can also be contemplated and are within the scope of the present invention. An exemplary scheduling mechanism for high speed data transmission is described in detail in the aforementioned U.S. patent application Ser. No. 08/798,951, now U.S. Pat. No. 6,335,922.

XII. Reverse Link Pilot/DRC Channel

One block diagram of the pilot/DRC channel is shown in FIG. 5. The DRC message is provided to DRC encoder 626, which encodes the message in accordance with a predetermined coding format. Coding of the DRC message is important since the error probability of the DRC message needs to be sufficiently low because incorrect forward link data rate determination impacts the system throughput performance. In one embodiment, DRC encoder 626 is a rate (8,4) CRC block encoder, which encodes the 3-bit DRC message into an 8-bit code word. The encoded DRC message is provided to multiplier 628 which covers the message with the Walsh code which uniquely identifies the destination Access Point 4 for which the DRC message is directed. The Walsh code is provided by Walsh generator 624. The covered DRC message is provided to multiplexer (MUX) 630, which multiplexes the message with the pilot data. The DRC message and the pilot data are provided to multipliers 650a and 650c, which spread the data with the PN_I and PN_Q signals, respectively. Thus, the pilot and DRC message are transmitted on both the inphase and quadrature phase of the sinusoid.

In one embodiment, the DRC message is transmitted to the selected Access Point 4. This is achieved by covering the DRC message with the Walsh code, which identifies the selected Access Point 4. In one embodiment, the Walsh code is 128 chips in length. The derivation of 128-chip Walsh codes are known in the art. One unique Walsh code is assigned to each Access Point 4, which is in communication with Access Terminal 6. Each Access Point 4 decovers the signal on the DRC channel with its assigned Walsh code. The selected Access Point 4 is able to decover the DRC message and transmits data to the requesting Access Terminal 6 on the forward link in response thereto. Other Access Points 4 are able to determine that the requested data rate is not directed to them because these Access Points 4 are assigned different Walsh codes.

In one embodiment, the reverse link short PN codes for all Access Points 4 in the data communication system is the same and there is no offset in the short PN sequences to distinguish different Access Points 4. The data communication system of one embodiment supports soft handoff on the reverse link. Using the same short PN codes with no offset allows multiple Access Points 4 to receive the same reverse link transmission from Access Terminal 6 during a soft handoff. The short PN codes provide spectral spreading but do not allow for identification of Access Points 4.

In one embodiment, the DRC message carries the requested data rate by Access Terminal 6. In another embodiment, the DRC message carries an indication of the forward link quality (e.g., the C/I information as measured by Access Terminal 6). Access Terminal 6 can simultaneously receive the forward link pilot signals from one or more Access Points 4 and performs the C/I measurement on each received pilot signal. Access Terminal 6 then selects the best Access Point 4 based on a set of parameters, which can comprise present and previous C/I measurements. The rate control information is formatted into the DRC message, which can be conveyed to Access Point 4 in one of several embodiments.

In one embodiment, Access Terminal 6 transmits a DRC message based on the requested data rate. The requested data rate is the highest supported data rate which yields satisfactory performance at the C/I measured by Access Terminal 6. From the C/I measurement, Access Terminal 6 calculates the maximum data rate, which yields satisfactory performance. Once the maximum data rate has been calculated, the maximum data rate is then quantized to one of the supported data rates and designated as the requested data rate. The data rate index corresponding to the requested data rate is transmitted to the selected Access Point 4. An exemplary set of supported data rates and the corresponding data rate indices are shown in Table 1.

Access Terminal 6 also calculates the excess C/I measurement. The excess C/I measurement is the C/I beyond that required for satisfactory performance. In one embodiment, Access Terminal 6 transmits a DRC message based on the C/I measurement. In this embodiment, the Access Point 4 calculates the maximum data rate that yields satisfactory performance. In another embodiment, Access Terminal 6 transmits a DRC message based on both the C/I measurement and the excess C/I measurement. In another embodiment, Access Terminal 6 transmits the excess C/I measurement on another channel. In embodiments wherein the excess C/I measurement is calculated, the Access Point 4 calculates the maximum data rate that yields satisfactory performance and reduces the traffic channel transmit power based on the excess C/I measurement. Then, the Access Terminal 6 demodulator 64 scales the traffic channel transmit power by the reduction.

In one embodiment, wherein Access Terminal 6 transmits an indication of the forward link quality to the selected Access Point 4, Access Terminal 6 transmits a C/I index, which represents the quantized value of the C/I measurement. The C/I measurement can be mapped to a table and associated with a C/I index. Using more bits to represent the C/I index allows a finer quantization of the C/I measurement. Also, the mapping can be linear or predistorted. For a linear mapping, each increment in the C/I index represents a corresponding increase in the C/I measurement. For example, each step in the C/I index can represent a 2.0 dB increase in the C/I measurement. For a predistorted mapping, each increment in the C/I index can represent a different increase in the C/I measurement. As an example, a predistorted mapping can be used to quantize the C/I measurement to match the cumulative distribution function (CDF) curve of the C/I distribution as shown in FIG. 6.

Other embodiments to convey the rate control information from Access Terminal 6 to Access Point 4 can be contemplated and are within the scope of the present invention. Furthermore, the use of different number of bits to represent the rate control information is also within the scope of the present invention.

In one embodiment, the C/I measurement and excess C/I measurement can be performed on the forward link pilot signal in the manner similar to that used in the CDMA system. A method and apparatus for performing the C/I measurement is disclosed in U.S. patent application Ser. No. 08/722,763, entitled "METHOD AND APPARATUS FOR MEASURING LINK QUALITY IN A SPREAD SPECTRUM COMMUNICATION SYSTEM," filed Sep. 27, 1996, now U.S. Pat. No. 5,903,554, issued May 11, 1999, assigned to the assignee of the present invention and incorporated by reference herein. In summary, the C/I measurement on the pilot signal can be obtained by despreading the received signal with the short PN codes. The C/I measurement on the pilot signal can contain inaccuracies if the channel condition changed between the time of the C/I measurement and the time of actual data transmission. In one embodiment, the use of the FAC bit allows Access Terminals 6 to take into consideration the forward link activity when determining the requested data rate.

In another embodiment, the C/I measurement and excess C/I measurement can be performed on the forward link traffic channel. The traffic channel signal is first despread with the long PN code and the short PN codes and decovered with the Walsh code. The C/I measurement on the signals on the data channels can be more accurate because a larger percentage of the transmitted power is allocated for data transmission. Other methods to measure the C/I of the received forward link signal by Access Terminal 6 can also be contemplated and are within the scope of the present invention.

In one embodiment, the requested data rate is conveyed to Access Point 4 by the use of an absolute reference and a relative reference. In this embodiment, the absolute reference comprising the requested data rate is transmitted periodically. The absolute reference allows Access Point 4 to determine the exact data rate requested by Access Terminal 6. For each time slots between transmissions of the absolute references, Access Terminal 6 transmits a relative reference to Access Point 4 which indicates whether the requested data rate for the upcoming time slot is higher, lower, or the same as the requested data rate for the previous time slot. Periodically, Access Terminal 6 transmits an absolute reference. Periodic transmission of the data rate index allows the requested data rate to be set to a known state and ensures that erroneous receptions of relative references do not accumulate. The use of absolute references and relative references can reduce the transmission rate of the DRC messages to Access Point 6. Other protocols to transmit the requested data rate can also be contemplated and are within the scope of the present invention.

The Reverse Link Access Channel is used by Access Terminal 6 to transmit messages to Access Point 4 during the registration phase. Access Terminal 6 transmits NACK messages on the Reverse Link NACK Channel.

Although the present invention has been described in the context of a NACK protocol, the use of an ACK protocol can be contemplated and are within the scope of the present invention.

The previous description of the disclosed embodiments is provided to enable any person skilled in the art to make or use the present invention. The various modifications to these embodiments will be readily apparent to those skilled in the art, and the generic principles defined herein may be applied to other embodiments. Thus, the present invention is not intended to be limited to the embodiments shown herein but is to be accorded the widest scope consistent with the principles and novel features disclosed herein.

We claim:

1. A method for packet data transmission from at least one Access Point to an Access Terminal comprising:
    receiving data request messages from a plurality of Access Terminals;
    calculating an average served rate for each of the plurality of Access Terminals;
    calculating a ratio of requested data rate to the average served rate for each of the plurality of Access Terminals;
    scheduling a transmission of data from the Access Terminal having the highest ratio of requested data rate to average served rate; and
    transmitting data from said selected Access Point at a randomly varying transmit power in accordance with said data request message.

2. The method of claim 1, wherein the ratio is calculated as: $DRC_I(n)/R_I(n)$, where $R_I(n)=(1-1/tc)*R_I(n-1)+(1/tc); DRC_I(n)$ is the requested data rate of Terminal I at a slot n; RI(n) is the average served rate in a slot n−1 to I; and tc is a scheduler time constant.

3. A method for packet data transmission from at least one Access Point to an Access Terminal in a communication system, comprising:
    receiving data request messages from a plurality of Access Terminals;
    calculating an average served rate for each of the plurality of Access Terminals;
    calculating a ratio of requested data rate to the average served rate for each of the plurality of Access Terminals;
    biasing a schedule of a transmission of data from the Access Terminal based on the ratio of requested data rate to average served rate; and
    transmitting data from said selected Access Point at a transmit power in synchronism with neighboring Access Points in the communication system in accordance with said data request message.

4. A method for packet data transmission from at least one Access Point to an Access Terminal in a communication system, comprising:
    receiving data request messages from a plurality of Access Terminals;
    calculating an average served rate for each of the plurality of Access Terminals;
    calculating a ratio of requested data rate to the average served rate for each of the plurality of Access Terminals;
    scheduling a transmission of data from the Access Terminal having the highest ratio of requested data rate to average served rate; and
    transmitting data from said selected Access Point at a transmit power in synchronism with neighboring Access Points in the communication system in accordance with said data request message.

5. The method of claim 4, wherein the transmit power is at a maximum depends on the Access Point's boresite azimuth angle.

6. The method of claim 5, wherein the transmit power $P(t)=P_0(dBm)+\partial(dB)*Cos(2*\pi*t/T-\theta)$ where, $P_O$ is the Access Point nominal transmit power;
$\theta$ is the Azimuth angle;
T is the time to scan 360°; and
$\partial$=peak in dB.

7. An Access Point, comprising:
    a means for receiving data request messages from a plurality of Access Terminals;
    a means for calculating an average served rate for each of the plurality of Access Terminals;
    a means for calculating a ratio of requested data rate to the average served rate for each of the plurality of Access Terminals;
    a means for scheduling a transmission of data from the Access Terminal having the highest ratio of requested data rate to average served rate; and
    a means for transmitting data from said selected Access Point at a randomly varying transmit power in accordance with said data request message.

* * * * *